United States Patent
Laverne

(10) Patent No.: US 11,175,434 B2
(45) Date of Patent: Nov. 16, 2021

(54) GEOLOGIC STRATIGRAPHY VIA IMPLICIT AND JUMP FUNCTIONS

(71) Applicant: Schlumberger Technology Corporation, Sugar Land, TX (US)

(72) Inventor: Thomas Laverne, Montpellier (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 354 days.

(21) Appl. No.: 15/572,457

(22) PCT Filed: May 10, 2016

(86) PCT No.: PCT/US2016/031553
§ 371 (c)(1),
(2) Date: Nov. 7, 2017

(87) PCT Pub. No.: WO2016/183043
PCT Pub. Date: Nov. 17, 2016

(65) Prior Publication Data
US 2018/0113235 A1    Apr. 26, 2018

(30) Foreign Application Priority Data
May 12, 2015   (FR) ...................................... 1554222

(51) Int. Cl.
*G06F 17/11*     (2006.01)
*G01V 99/00*     (2009.01)
(Continued)

(52) U.S. Cl.
CPC ............ *G01V 99/005* (2013.01); *G06F 17/11* (2013.01); *G01V 2210/642* (2013.01);
(Continued)

(58) Field of Classification Search
CPC ............ G01V 99/005; G01V 2210/66; G01V 2210/642; G06F 17/11; G06F 2111/10;
(Continued)

(56) References Cited

U.S. PATENT DOCUMENTS 5,661,698 A   8/1997 Cacas
6,106,561 A   8/2000 Farmer
(Continued)

FOREIGN PATENT DOCUMENTS

EP   2631685 A2   8/2013

OTHER PUBLICATIONS

Bouhala, L., et al. "An XFEM crack-tip enrichment for a crack terminating at a bi-material interface." Engineering Fracture Mechanics 102 (2013): 51-64.*
(Continued)

*Primary Examiner* — Kibrom K Gebresilassie

(57) ABSTRACT

A method can include receiving a mesh that represents a geologic environment where the mesh includes elements; receiving location information for a discontinuity in the geologic environment; based at least in part on the location information, defining enrichment equations for a portion of the elements where the enrichment equations include a jump function that models the discontinuity; solving a system of equations for an implicit function where the system of equations includes the enrichment equations; and, based at least in part on the solving, outputting values for the implicit function with respect to at least a portion of the mesh.

19 Claims, 16 Drawing Sheets

(51) Int. Cl.
    *G06F 111/10*     (2020.01)
    *G06F 30/20*     (2020.01)
    *G06F 30/23*     (2020.01)
    *G09B 23/40*     (2006.01)
    *G06T 17/05*     (2011.01)

(52) U.S. Cl.
    CPC .......... *G01V 2210/66* (2013.01); *G06F 30/20* (2020.01); *G06F 30/23* (2020.01); *G06F 2111/10* (2020.01); *G06T 17/05* (2013.01); *G09B 23/40* (2013.01)

(58) Field of Classification Search
    CPC ...... G06F 2217/16; G06F 30/23; G06F 30/20; G06T 17/05; G09B 23/40
    See application file for complete search history.

(56) References Cited

U.S. PATENT DOCUMENTS

| | | | | |
|---|---|---|---|---|
| 8,600,708 | B1* | 12/2013 | Mallet | G06T 17/05 703/2 |
| 2009/0248374 | A1* | 10/2009 | Huang | E21B 43/00 703/2 |
| 2010/0286917 | A1 | 11/2010 | Hazlett et al. | |
| 2011/0106507 | A1* | 5/2011 | Lepage | G01V 11/00 703/2 |
| 2014/0052427 | A1 | 2/2014 | Yahiaoui et al. | |
| 2014/0136158 | A1 | 5/2014 | Hegazy et al. | |
| 2014/0222403 | A1 | 8/2014 | Lepage et al. | |
| 2015/0066460 | A1* | 3/2015 | Klinger | G06F 17/5018 703/2 |

OTHER PUBLICATIONS

Mallet, "Geomodelling", Cambridge University Press, 2001.
Ledez, "Modelisation d'Objets Naturels par Formulation Implicite", PhD Thesis, Institut National Polytechnique de Lorraine, Oct. 2003.
Frank et al., "3D Reconstruction of complex geological interfaces from irregularly distributed and noisy point data", Computers & Geosciences, vol. 33, Issue 7, Jul. 2007.
Lepage, "Generation de Maillage Tridimensionels pour la Simulation des Phénomènes Physique en Géosciences," PhD Thesis, Institut National Polytechnique de Lorraine, 2003.
Richardson, et al., "An XFEM method for modeling geometrical elaborate crack propagation in brittle materials", International Journal for Numerical Methods in Engineering, 2009.
Siavelis, "Modélisation numérique X-FEM de grands glissements avec frottement le long d'un réseau de discontuinités," PhD Thesis, Ecole Centrale de Nantes 2011.
Coon, "Nitsche Extended Finite Element Method for Earthquake Simulation", PhD Columbia University 2010.
Du, "eXtended Finite Element Method (XFEM) in Abaqus", slides presentation, Mar. 13, 2013.
Belytschko et al. "A Review of Extended/Generalized Finite Element Methods for Material Modeling." Modelling and Simulation in Materials Science and Engineering 17.4, 2009.
Gutierrez, et al., "XHEM Framework for Cutting Soft Tissue—Including Topological Changes in a Surgery Simulation," Proceedings of the International Conference on Computer Graphics Theory and Applications, Angers, France, May 17-21, 2010.
International Search Report and Written Opinion for the equivalent International patent application PCT/US2016/031553 dated Aug. 17, 2016.

* cited by examiner

Mesh 1010

Mesh 1310

GEOLOGIC STRATIGRAPHY VIA IMPLICIT AND JUMP FUNCTIONS

CROSS-REFERENCE TO RELATED APPLICATION

The present document is based on and claims priority to FR Non-Provisional Application Serial No.: 1554222, filed May 12, 2015, which is incorporated herein by reference in its entirety.

BACKGROUND

Phenomena associated with a sedimentary basin may be modeled using a mesh, a grid, etc. As an example, a structural model may be created based on data associated with a sedimentary basin. For example, where a basin includes various types of features (e.g., stratigraphic layers, faults, etc.), data associated with such features may be used to create a structural model of the basin. Such a model may be a basis for analysis, further modeling, etc. Various technologies, techniques, etc., described herein pertain to structural modeling, structural models, etc.

SUMMARY

A method can include receiving a mesh that represents a geologic environment where the mesh includes elements; receiving location information for a discontinuity in the geologic environment; based at least in part on the location information, defining enrichment equations for a portion of the elements where the enrichment equations include a jump function that models the discontinuity; solving a system of equations for an implicit function where the system of equations includes the enrichment equations; and, based at least in part on the solving, outputting values for the implicit function with respect to at least a portion of the mesh. A system can include a processor; memory operatively coupled to the processor; one or more modules stored in the memory where the one or more modules include processor-executable instructions where the instructions include instructions to: receive a mesh that represents a geologic environment where the mesh includes elements; receive location information for a discontinuity in the geologic environment; based at least in part on the location information, define enrichment equations for a portion of the elements where the enrichment equations include a jump function that models the discontinuity; solve a system of equations for an implicit function where the system of equations include the enrichment equations; and output values for the implicit function with respect to at least a portion of the mesh. One or more computer-readable storage media can include processor-executable instructions where the instruction include instructions to instruct a system to: receive a mesh that represents a geologic environment where the mesh includes elements; receive location information for a discontinuity in the geologic environment; based at least in part on the location information, define enrichment equations for a portion of the elements where the enrichment equations include a jump function that models the discontinuity; solve a system of equations for an implicit function where the system of equations include the enrichment equations; and output values for the implicit function with respect to at least a portion of the mesh. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
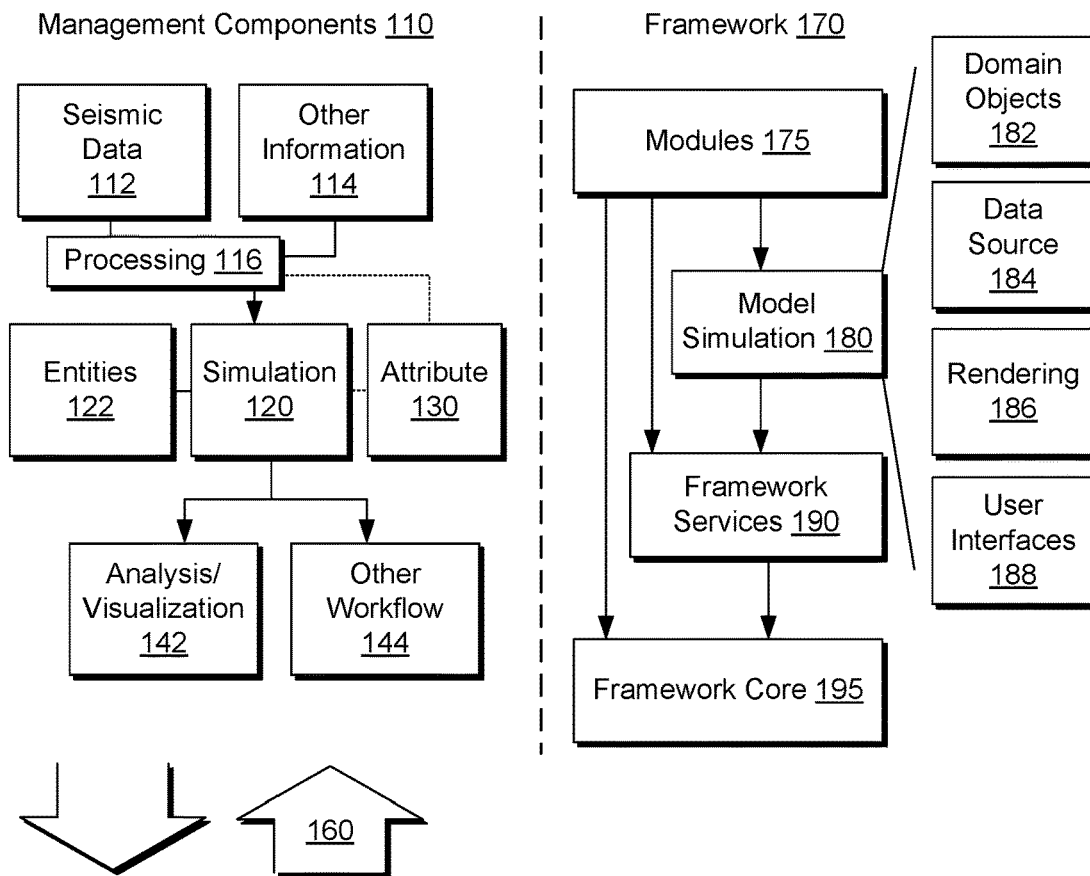
FIG. 1 illustrates an example system that includes various components for simulating a geological environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Phenomena associated with a sedimentary basin (e.g., a subsurface region, whether below a ground surface, water surface, etc.) may be modeled using a model or models. As an example, a structural model of a basin may find use for understanding various processes related to exploration and production of natural resources (estimating reserves in place, drilling wells, forecasting production, etc.). As an example, a structural model may be used as a basis for building a model for use with a numerical technique.

For application of a numerical technique, equations may be discretized using a grid that includes nodes, cells, etc. To represent features in a geologic environment, a structural model may assist with properly locating nodes, cells, etc. of a grid for use in simulation using one or more numerical techniques. As an example, a structural model may itself include a mesh, which may, at times be referred to as a grid. As an example, a structural model may provide for analysis optionally without resorting to creation of a grid suited for discretization of equations for a numerical solver (e.g., consider a structured grid that may reduce computational demands, etc.).

As to numerical techniques, a numerical technique such as the finite difference method can include discretizing a 1D differential heat equation for temperature with respect to a spatial coordinate to approximate temperature derivatives (e.g., first order, second order, etc.). Where time is of interest, a derivative of temperature with respect to time may also be provided. As to the spatial coordinate, the numerical technique may rely on a spatial grid that includes various nodes where a temperature will be provided for each node upon solving the heat equation (e.g., subject to boundary conditions, generation terms, etc.). Such an example may apply to multiple dimensions in space (e.g., where discretization is applied to the multiple dimensions). Thus, a grid may discretize a volume of interest (VOI) into elementary elements (e.g., cells or grid blocks) that may be assigned or associated with properties (e.g. porosity, rock type, etc.), which may be germane to simulation of physical processes (e.g., fluid flow, reservoir compaction, etc.).

As another example of a numerical technique, consider the finite element method where space may be represented by one dimensional or multidimensional "elements". For one spatial dimension, an element may be represented by two nodes positioned along a spatial coordinate. For multiple spatial dimensions, an element may include any number of nodes. Further, some equations may be represented by certain nodes while others are represented by fewer nodes (e.g., consider an example for the Navier-Stokes equations where fewer nodes represent pressure). The finite element method may include providing nodes that can define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a grid, may be referred to as grid cells.

Yet another example of a numerical technique is the finite volume method. For the finite volume method, values for model equation variables may be calculated at discrete places on a grid, for example, a node of the grid that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a grid may define grid cells.

As mentioned, where a sedimentary basin (e.g., subsurface region) includes various types of features (e.g., stratigraphic layers, faults, etc.) where nodes, cells, etc. of a mesh or grid may represent, or be assigned to, such features. As an example, consider a structural model that may include one or more meshes. Such a model may serve as a basis for formation of a grid for discretized equations to represent a sedimentary basin and its features.

As to a stratigraphic sequence, a sedimentary basin may include sedimentary deposits grouped into stratigraphic units, for example, based on any of a variety of factors, to approximate or represent time lines that place stratigraphy in a chronostratigraphic framework. While sequence stratigraphy is mentioned, lithostratigraphy may be applied, for example, based on similarity of lithology of rock units (e.g., rather than time-related factors).

As an example, a mesh may conform to structural features such as, for example, Y-faults, X-faults, low-angle unconformities, salt bodies, intrusions, etc. (e.g., geological discontinuities), to more fully capture complexity of a geological model. As an example, a mesh may optionally conform to stratigraphy (e.g., in addition to one or more geological discontinuities). As to geological discontinuities, these may include model discontinuities such as one or more model boundaries. As an example, a mesh may be populated with property fields generated, for example, by geostatistical methods.

In general, a relationship may exist between node spacing and phenomenon or phenomena being modeled. Various scales may exist within a geologic environment, for example, a molecular scale may be on the order of approximately $10^{-9}$ to approximately $10^{-8}$ meters, a pore scale may be on the order of approximately $10^{-6}$ to approximately $10^{-3}$ meters, bulk continuum may be on the order of approximately $10^{-3}$ to approximately $10^{-2}$ meters, and a basin scale on the order of approximately $10^3$ to approximately $10^5$ meters. As an example, nodes of a mesh may be selected based at least in part on the type of phenomenon or phenomena being modeled (e.g., to select nodes of appropriate spacing or spacings). As an example, nodes of a grid may include node-to-node spacing of about 10 meters to about 500 meters. In such an example, a basin being modeled may span, for example, over approximately $10^3$ meters. As an example, node-to-node space may vary, for example, being smaller or larger than the aforementioned spacings.

Some data may be involved in building an initial mesh and, thereafter, a model, a corresponding mesh, etc. may optionally be updated in response to model output, changes in time, physical phenomena, additional data, etc. Data may include one or more of the following: depth or thickness maps and fault geometries and timing from seismic, remote-sensing, electromagnetic, gravity, outcrop and well log data. Furthermore, data may include depth and thickness maps stemming from facies variations.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

As an example, a method may include structural modeling, for example, building a structural model, editing a structural model, etc. of a geologic environment. As an example, a workflow may include providing a structural model prior to construction of a grid (e.g., using the structural model), which may, in turn, be suitable for use with one or more numerical techniques. As an example, one or more applications may operate on a structural model (e.g., input of a structural model).

Figure 2:
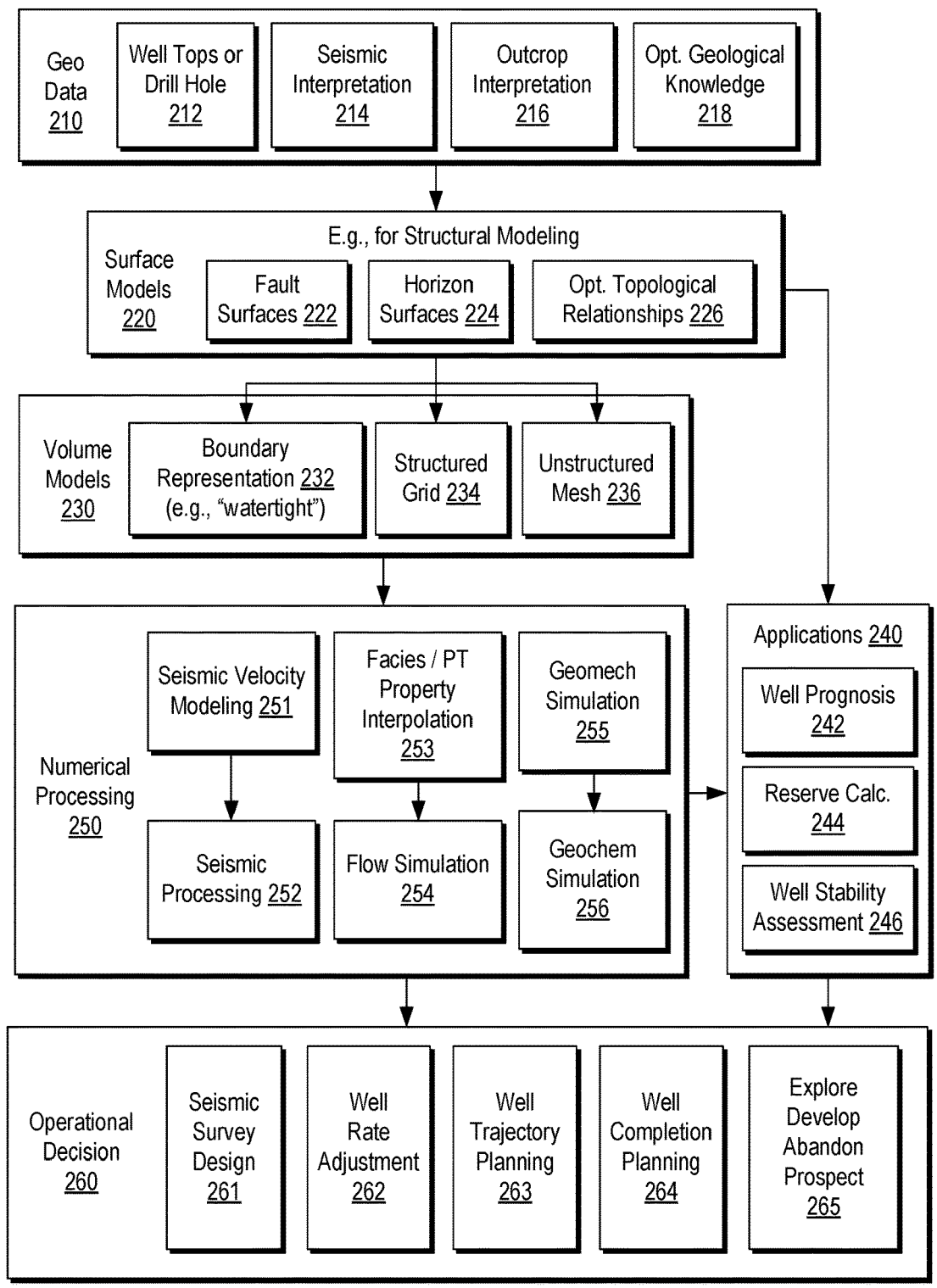
FIG. 2 illustrates an example of a system.

FIG. 2 shows an example of a system 200 that includes a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrotechnical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces, unconformal surfaces, geobodies, etc.) or mechanical discontinuities (fault surfaces) in the subsurface. As an example, a structural model may include some information about one or more topological relationships between surfaces (e.g. fault A truncates fault B, fault B intersects fault C, etc.).

As an example, an environment may include one or more conformal surfaces and/or one or more unconformal surfaces. As an example, an unconformity may be a geological surface that is disposed between older material from younger material (e.g., older rock and younger rock) and that represents a gap in a geologic record. As an example, such a surface might result from a hiatus in deposition of sediments, possibly in combination with erosion, or deformation such as faulting. An angular unconformity may be a type of unconformity that separates younger strata from eroded, dipping older strata. As an example, a disconformity may represent a time of nondeposition, possibly combined with erosion. As an example, a nonconformity may separate overlying strata from eroded, older igneous or metamorphic rocks. As an example, a workflow may include analysis and interpretation of one or more unconformities (e.g., locally, regionally and/or globally) and may include analysis and interpretation of sequence stratigraphy based at least in part thereon.

As an example, a conformable surface may be a conformable horizon surface, for example, a horizon surface between a lower horizon and an upper horizon where the horizons have undergone a relatively common geologic history, for example, being deposited in succession (e.g., continuous in time). As an example, in an environment, horizons may not intersect one another and each of the horizons may be considered conformable to adjacent horizons (e.g., lower and upper or older and younger).

As an example, erosion may act to denude rock, for example, as a result of physical, chemical and/or biological breakdown and/or transportation. Erosion may occur, for example, as material (e.g., weathered from rock, etc.) is transported by fluids, solids (e.g., wind, water or ice) or mass-wasting (e.g., as in rock falls and landslides). As an example, consider two sequences where a lower sequence may have been eroded and an upper sequence deposited on top of the eroded lower sequence. In such an example, the boundary between the two sequences may be referred to as an erosion; noting that it is conformable to the upper, younger sequence. As an example, erosion may act to "truncate" a sequence of horizons and to form surface upon which subsequent material may be deposited (e.g., optionally in a conformable manner).

As an example, a baselap may be a type of feature in an environment, for example, such as a downlap or an onlap. As an example, a downlap may be a termination of more steeply dipping overlying strata against a surface or underlying strata that have lower apparent dips. For example, a downlap may be seen at the base of prograding clinoforms and may represent progradation of a basin margin. As to an onlap, for example, it may be a termination of shallowly dipping, younger strata against more steeply dipping, older strata (e.g., sequence stratigraphy that may occur during periods of transgression). As an example, a type of baselap may be considered to be a downlap (e.g., lower strata having lower apparent dips). In such an example, the baselap boundary tends to be conformable to immediately older horizons (lower sequence).

As an example, given three sequences, a discontinuity may exist as a boundary that is neither conformable to older horizons nor to younger ones. As an example, erosions, baselaps and discontinuities may be referred to as unconformities or non-conformable horizons (e.g., or surfaces, layers, etc.).

As an example, one or more intrusions may exist in an environment. For example, an intrusion may be a structure or structures formed via a process known as sediment injection. For example, consider sills emplaced parallel to bedding or dikes that cut through bedding. Strata that include an intrusion may be referred to as host strata and the layer or layers that feed an intrusion may be referred to as a parent bed or beds. As an example, a sand-injection feature may exhibit a size scale, which may be, for example, of an order within a range of an order of millimeters to an order of kilometers. Evidence of a feature may exist in a core, a borehole image log, a seismic section, an outcrop, an aerial photograph, a satellite image, etc. (e.g., depending on size scale).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill-bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

As an example, a method may include implicit modeling that includes using one or more implicit functions. As an example, such a method can include representing geological horizons in three-dimensions using specific iso-surfaces of a scalar property field (e.g., an implicit function) defined on a three-dimensional background mesh. As an example, a method can include representing one or more types of features additionally or alternatively to geological horizons. For example, consider a method that includes representing one or more unconformities or other types of features.

As an example, a method that includes implicit modeling may assist with exploration and production of natural resources such as, for example, hydrocarbons or minerals. As an example, such a method may include modeling one or more faulted structures that may include geological layers that vary spatially in thickness. As an example, such a method may be employed to model large (basin) scale areas, syn-tectonic deposition, etc.

Figure 3:
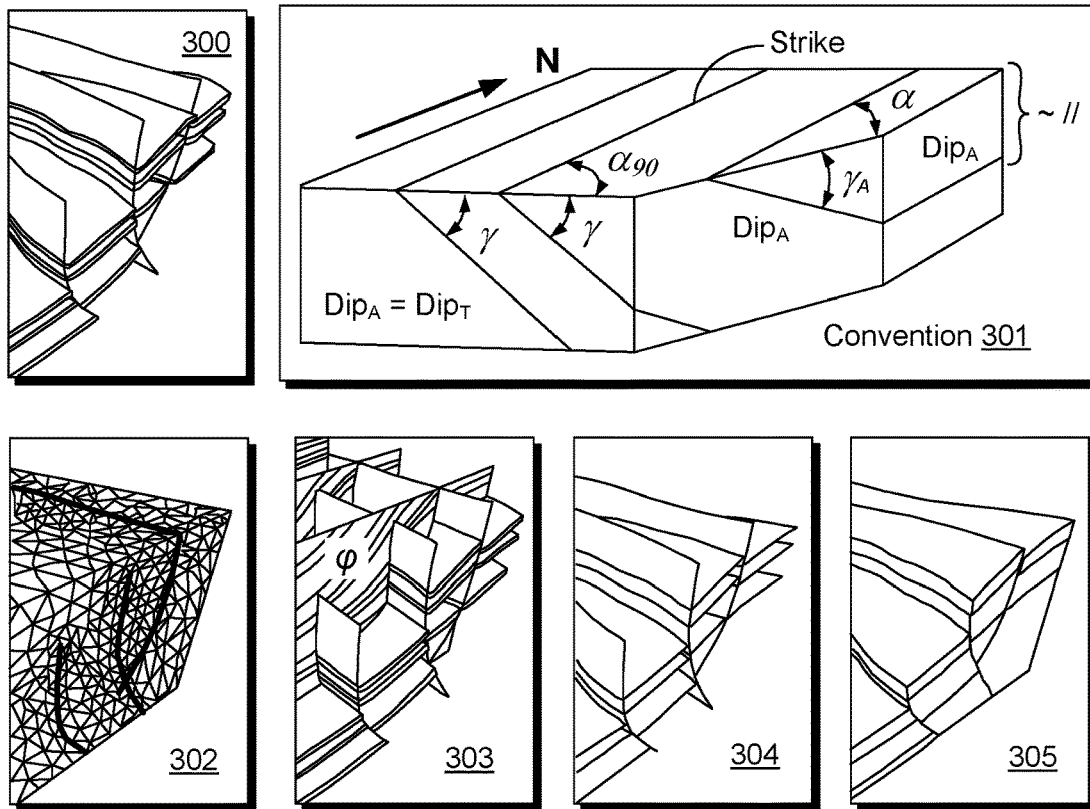
FIG. 3 illustrates examples of a method, a convention, constraints and equations.

FIG. 3 shows an example of a plot of a geologic environment 300 that may be represented in part by a convention 301. As an example, a method may employ implicit modeling to analyze the geologic environment, for example, as shown in the plots 302, 303, 304 and 305. FIG. 3 also shows an example of a control point constraints formulation 310 and an example of a linear system of equations formulation 330, which pertain to an implicit function ($\varphi$).

In FIG. 3, the plot of the geologic environment 300 may be based at least in part on input data, for example, related to one or more fault surfaces, horizon points, etc. As an example, one or more features in such a geologic environment may be characterized in part by dip.

As an example, dip may be specified according to the convention 301, as graphically illustrated in FIG. 3. As shown by the convention 301, the three dimensional orientation of a plane may be defined by its dip and strike. Per the convention 301, dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 301 of FIG. 3, various angles $\gamma$ indicate angle of slope downwards, for example, from an imaginary horizontal plane (e.g., flat upper surface); whereas, azimuth refers to the direction towards which a dipping plane slopes (e.g., which may be given with respect to degrees, compass directions, etc.). In the convention 301, various angles are represented by the Greek letter gamma as the Greek letter phi appears in association with various examples that include implicit modeling. Another feature shown in the convention 301 of FIG. 3 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 301 of FIG. 3). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 301 of FIG. 3). Apparent dip may be the dip of a plane as measured in any other direction except in the direction of true dip (see, e.g., $\gamma_A$ as $Dip_A$ for angle $\alpha$); however, it is possible that the apparent dip is equal to the true dip (see, e.g., $\gamma$ as $Dip_A$=$Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 301 of FIG. 3, the dip of a plane as seen in a cross-section perpendicular to the strike is true dip (see, e.g., the surface with $\gamma$ as $Dip_A$=$Dip_T$ for angle $\alpha_{90}$ with respect to the strike). As indicated, dip observed in a cross-section in any other direction is apparent dip (see, e.g., surfaces labeled $Dip_A$). Further, as shown in the convention 301 of FIG. 3, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 301 may be used with respect to an analysis, an interpretation, an attribute, a model, etc. (see, e.g., various blocks of the system 100 of FIG. 1 and the system 200 of FIG. 2). As an example, various types of features may be described, in part, by dip (e.g., sedimentary bedding, horizons, faults and fractures, cuestas, igneous dikes and sills, metamorphic foliation, etc.).

Seismic interpretation may aim to identify and classify one or more subsurface boundaries based at least in part on one or more dip parameters (e.g., angle or magnitude, azimuth, etc.). As an example, various types of features (e.g., sedimentary bedding, horizons, faults and fractures, cuestas, igneous dikes and sills, metamorphic foliation, etc.) may be described at least in part by angle, at least in part by azimuth, etc.

Referring to the plots 302, 303, 304 and 305 of FIG. 3, these may represent portions of a method that can generate a model of a geologic environment such as the geologic environment represented in the plot 300.

As an example, a volume based modeling method may include receiving input data (see, e.g., the plot 300); generating a volume mesh, which may be, for example, an unstructured tetrahedral mesh (see, e.g., the plot 302);

calculating implicit function values, which may represent stratigraphy and which may be optionally rendered using a periodic map (see, e.g., the plot 303 and the implicit function $\varphi$ as represented using periodic mapping); extracting one or more horizon surfaces as iso-surfaces of the implicit function (see, e.g., the plot 304); and generating a watertight model of geological layers, which may optionally be obtained by subdividing a model at least in part via implicit function values (see, e.g., the plot 305).

As an example, an implicit function calculated for a geologic environment includes isovalues that may represent stratigraphy of modeled layers. For example, depositional interfaces identified via interpretations of seismic data (e.g., signals, reflectors, etc.) and/or on borehole data (e.g., well tops, etc.) may correspond to iso-surfaces of the implicit function. As an example, where reflectors correspond to isochronous geological sequence boundaries, an implicit function may be a monotonous function of stratigraphic age of geologic formations.

As an example, a process for creating a geological model may include: building an unstructured faulted 2D mesh (e.g., if a goal is to build a cross section of a model) or a 3D mesh from a watertight representation of a fault network; representing, according to an implicit function-based volume attribute, stratigraphy by performing interpolations on the built mesh; and cutting the built mesh based at least in part on iso-surfaces of the attribute to generate a volume representation of geological layers. Such a process may include outputting one or more portions of the volume representation of the geological layers (e.g., for a particular layer, a portion of a layer, etc.).

As an example, to represent complex depositional patterns, sequences that may be separated by one or more geological unconformities may optionally be modeled using one or more volume attributes. As an example, a method may include accounting for timing of fault activity (e.g., optionally in relationship to deposition) during construction of a model, for example, by locally editing a mesh on which interpolation is performed (e.g., between processing of two consecutive conformable sequences).

Referring to the control point constraints formulation 310, a tetrahedral cell 312 is shown as including a control point 314. As an example, an implicit function may be a scalar field. As an example, an implicit function may be represented as a property or an attribute, for example, for a volume (e.g., a volume of interest). As an example, the aforementioned PETREL® framework may include a volume attribute that includes spatially defined values that represent values of an implicit function.

As an example, as shown with respect to the linear system of equations formulation 330, a function "F" may be defined for coordinates (x, y, z) and equated with an implicit function denoted $\varphi$. As to constraint values, the function F may be such that each input horizon surface "I" corresponds to a known constant value $h_i$ of $\varphi$. For example, FIG. 3 shows nodes (e.g., vertices) of the cell 312 as including $a_0$, $a_1$, $a_2$ and $a_3$ as well as corresponding values of $\varphi$ (see column vector). As to the values value $h_i$ of $\varphi$, if a horizon I is younger than horizon J, then $h_i > h_j$ and, if one denotes T_ij* as an average thickness between horizons I and J, then $(h_k - h_i)/(h_j - h_i) \sim$ T_ik*/Tij*, for which a method can include estimating values of T_ij* before an interpolation is performed. Note that such a method may, as an example, accept lower values $h_i$ of $\varphi$ for younger horizons, where, for example, a constraint being that, within each conformal sequence, the values $h_i$ of $\varphi$ vary monotonously with respect to the age of the horizons.

As to interpolation of "F", as an example, $\varphi$ may be interpolated on nodes of a background mesh (e.g., a triangulated surface in 2D, a tetrahedral mesh in 3D, a regular structured grid, quad/octrees, etc.) according to several constraints that may be honored in a least squares sense. In such an example, as the background mesh may be discontinuous along faults, interpolation may be discontinuous as well; noting that "regularization constraints" may be included, for example, for constraining smoothness of interpolated values.

As an example, a method may include using fuzzy control point constraints. For example, at a location of interpretation points, $h_i$ of $\varphi$ (see, e.g. point a* in FIG. 3). As an example, an interpretation point may be located at a location other than that of a node of a mesh onto which an interpolation is performed, for example, as a numerical constraint may be expressed as a linear combination of values of $\varphi$ at nodes of a mesh element (e.g. a tetrahedron, tetrahedral cell, etc.) that includes the interpretation point (e.g., coefficients of a sum being barycentric coordinates of the interpretation point within the element or cell).

For example, for an interpretation point p of a horizon I located inside a tetrahedron which includes vertices are $a_0$, $a_1$, $a_2$ and $a_3$ and which barycentric coordinates are $b_0$, $b_1$, $b_2$ and $b_3$ (e.g., such that the sum of the barycentric coordinates is approximately equal to 1) in the tetrahedron, an equation may be formulated as follows:

$$b_0\varphi(a_0) + b_1\varphi(a_1) + b_2\varphi(a_2) + b_3\varphi(a_3) = h_i$$

where unknowns in the equation are $\varphi(a_0)$, $\varphi(a_1)$, $\varphi(a_2)$ and $\varphi(a_3)$. For example, refer to the control point $\varphi(a^*)$, labeled 314 in the cell 312 of the control point constraints formulation 310 of FIG. 3, with corresponding coordinates (x*, y*, z*); noting a matrix "M" for coordinates of the nodes or vertices for $a_0$, $a_1$, $a_2$ and $a_3$, (e.g., $x_0$, $y_0$, $z_0$ to $x_3$, $y_3$, $z_3$).

As an example, a number of such constraints of the foregoing type may be based on a number of interpretation points where, for example, interpretation points may be for decimated interpretation (e.g., for improving performance).

As mentioned, a process may include implementing various regularization constraints, for example, for constraining smoothness of interpolated values, of various orders (e.g., constraining smoothness of $\varphi$ or of its gradient $\nabla\varphi$), which may be combined, for example, through a weighted least squares scheme.

As an example, a method can include constraining the gradient $\nabla\varphi$ in a mesh element (e.g. a tetrahedron, a tetrahedral cell, etc.) to take an arithmetic average of values of the gradients of $\varphi$ (e.g., a weighted average) with respect to its neighbors (e.g., topological neighbors). As an example, one or more weighting schemes may be applied (e.g. by volume of an element) that may, for example, include defining of a topological neighborhood (e.g., by face adjacency). As an example, two geometrically "touching" mesh elements that are located on different sides of a fault may be deemed not topological neighbors, for example, as a mesh may be "unsewn" along fault surfaces (e.g., to define a set of elements or a mesh on one side of the fault and another set of elements or a mesh on the other side of the fault).

As an example, within a mesh, if one considers a mesh element $m_i$ that has n neighbors $m_j$ (e.g., for a tetrahedron), one may formulate an equation of an example of a regularization constraint as follows:

$$\nabla\varphi(m_i) = \frac{1}{n}\sum_{j=1}^{n}\nabla\varphi(m_j)$$

In such an example of a regularization constraint, solutions for which isovalues of the implicit function would form a "flat layer cake" or "nesting balls" geometries may be considered "perfectly smooth" (i.e. not violating the regularization constraint), it may be that a first one is targeted.

As an example, one or more constraints may be incorporated into a system in linear form. For example, hard constraints may be provided on nodes of a mesh (e.g., a control node). In such an example, data may be from force values at the location of well tops. As an example, a control gradient, or control gradient orientation, approach may be implemented to impose dip constraints.

Referring again to FIG. 3, the linear system of equations formulation 330 includes various types of constraints. For example, a formulation may include harmonic equation constraints, control point equation constraints (see, e.g., the control point constraints formulation 310), gradient equation constraints, constant gradient equation constraints, etc. As shown in FIG. 3, a matrix A may include a column for each node and a row for each constraint. Such a matrix may be multiplied by a column vector such as the column vector $\varphi(a_i)$ (e.g., or $\varphi$), for example, where the index "i" corresponds to a number of nodes, vertices, etc. for a mesh (e.g., a double index may be used, for example, $a_{ij}$, where j represents an element or cell index). As shown in the example of FIG. 3, the product of A and the vector $\varphi$ may be equated to a column vector F (e.g., including non-zero entries where appropriate, for example, consider $\phi_{control\ point}$ and $\phi_{gradient}$).

FIG. 3 shows an example of a harmonic constraint graphic 334 and an example of a constant gradient constraint graphic 338. As shown per the graphic 334, nodes may be constrained by a linear equation of a harmonic constraint (e.g., by topological neighbors of a common node). As shown per the graphic 338, two tetrahedra may share a common face (cross-hatched), which is constrained to share a common value of a gradient of the implicit function $\varphi$, which, in the example of FIG. 3, constrains the value of $\varphi$ at the 5 nodes of the two tetrahedra.

As an example, regularization constraints may be used to control interpolation of an implicit function, for example, by constraining variations of a gradient of the implicit function. As an example, constraints may be implemented by specifying (e.g., as a linear least square constraint) that the gradient should be similar in two co-incident elements of a mesh or, for example, by specifying that, for individual elements of a mesh, that a gradient of the implicit function should be an average of the gradients of the neighboring elements. In geological terms, such constraints may translate to (1) minimization of variations of dip and thickness of individual layers, horizontally, and (2) to minimization of the change of relative layer thicknesses, vertically.

As an example, aforementioned effects as to minimization of variations and minimization of changes may impact a resulting model. As an example, a method may include applying one or more techniques that may counter such effects, for example, by splitting a linear system of equations formulation, by splitting one or more trends, etc. As an example, one or more of such techniques may be implemented in response to input data (e.g., seismic interpretation, bore observations, etc.) that indicates that variations of dip, thickness of one or more layers exceed one or more criteria. For example, consider a criterion that acts to classify dip as being large (e.g., more than about 10 degrees of variation of dip of a geological interface), a criterion that acts to classify thickness as being varied (e.g., more than doubling of thickness of a layer from one part to another of a model), etc.

As an example, schematically, computation of an implicit function may be performed in a manner that aims to honor two types of constraints: (1) the minimization of the misfit between the interpretation data and the interpolated surfaces and (2) a regularization constraint that aims to ensure smoothness and monotonicity of an interpolated property.

As explained, values of an implicit function at nodes of a volume mesh may be determined by solving a sparse linear system of equations (see, e.g., the linear system of equations formulation 330 of FIG. 3). As shown in FIG. 3, various constraints may be applied, which may, for example, be selected in an effort to better constrain one or more features (e.g., local dip of a geological layer, etc.) by constraining a gradient of the implicit function. As an example, a solution procedure may include honoring one or more constraints in a least square sense, for example, using a weighted least square scheme that may act to balance effects of contradicting constraints in a solution for a linear system of equations.

As an example, a method may include relaxing one or more regularization constraints used for interpolating an implicit functions, for example, such that the interpolation can account for one or more high frequency thickness variations.

As an example, a method may include removing one or more low frequency trends of thickness variations from data (e.g., input data, etc.), optionally prior to performing an interpolation of an implicit function, and, for example, adding the one or more trends (e.g., as appropriate) back to the implicit function. As an example, such an approach may be applied to complex faulted reservoirs, for example, optionally independently from fault offsets.

As an example, one or more methods may be applied for interpolating an implicit function, for example, with the purpose of representing a set of conformable (e.g., non-intersecting) layers. As an example, a method may employ one or more techniques, for example, a method may employ a relaxation technique, an extraction technique or a relaxation technique and an extraction technique.

Figure 4:
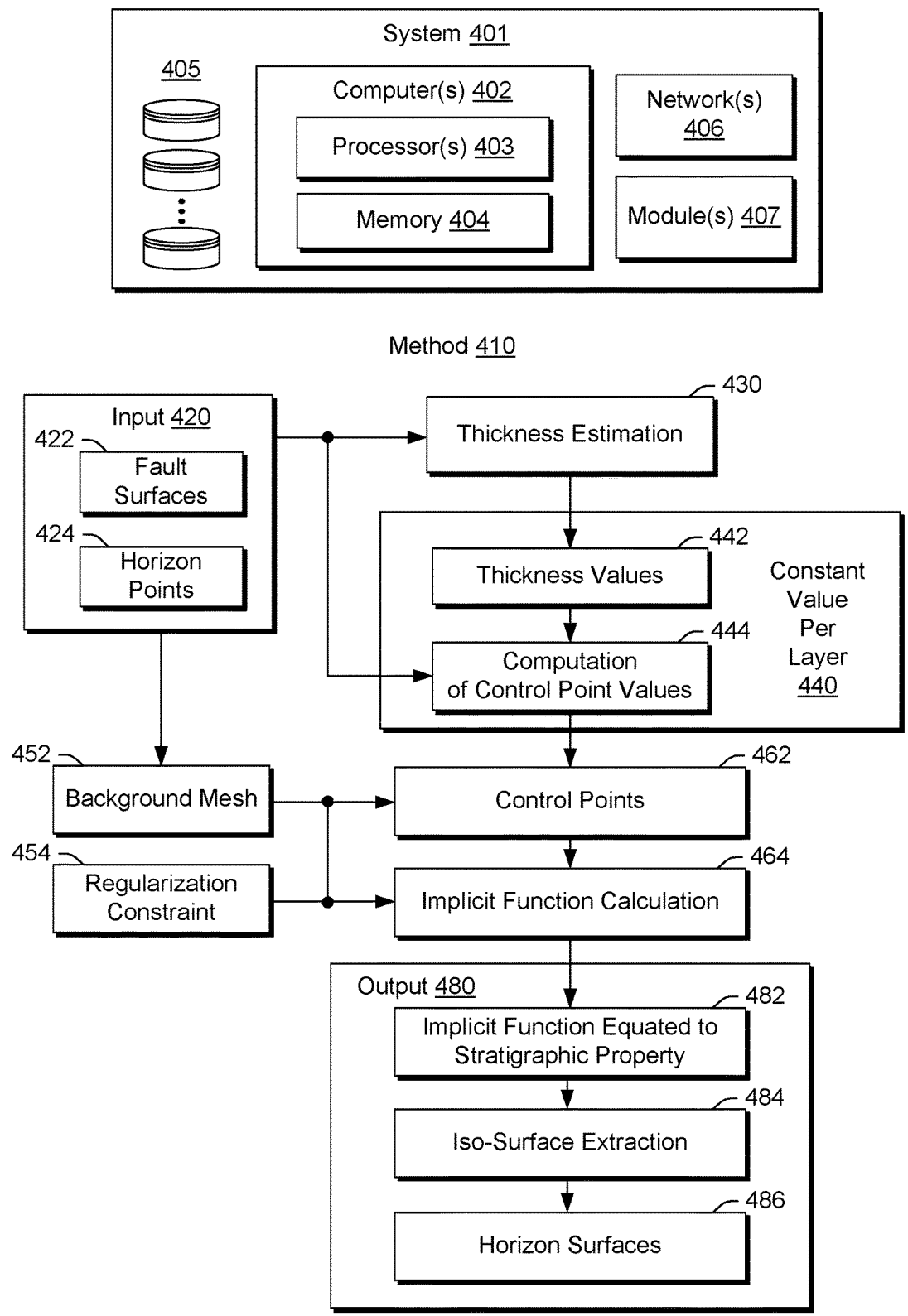
FIG. 4 illustrates an example of a system and an example of a method.

FIG. 4 shows an example of a system 401 and a method 410. As shown in FIG. 4, the system 401 includes one or more computers 402, one or more storage devices 405, one or more networks 406 and one or more modules 407. As to the one or more computers 402, each computer may include one or more processors (e.g., or processing cores) 403 and memory 404 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, data may be provided in the storage device(s) 405 where the computer(s) 402 may access the data via the network(s) 406 and process the data via the module(s) 407, for example, as stored in the memory 404 and executed by the processor(s) 403.

FIG. 4 also shows a block diagram of the method 410, which includes an input block 420 and output block 480, for example, to output an implicit function equated to a stratigraphic property per a block 482. As to the input block 420, it may include a fault surfaces input block 422 and a horizon points input block 424. As shown in the example of FIG. 4, the input block 420 may provide input to a thickness estimation block 430, a layer block 440 and a background mesh block 452.

As to the layer block 440, it can include a thickness values block 442 for determining or receiving thickness values (e.g., based on or from the thickness estimation block 430) and a computation block 444 for computing control point values (see, e.g., the formulations 310 and 330 of FIG. 3). As shown, the layer block 440 can output control points to a control points block 462, which may be defined with respect to a mesh provided by the background mesh block 452. As an example, the control points of the control points block 462 may account for one or more regularization constraints per a regularization constraint block 454.

As an example, given control point values for layers definable with respect to a mesh and subject to one or more constraints, a method can include calculating values of an implicit function (e.g., or implicit functions). As shown in the example of FIG. 4, an implicit function calculation block 462 can receive control points and one or more constraints defined with respect to a mesh (e.g., elements, cells, nodes, vertices, etc.) and, in turn, calculate values for one or more implicit functions.

As to the output block 480, given calculated values for one or more implicit functions, these may be associated with, for example, a stratigraphic property per the block 482. As an example, one or more iso-surfaces may be extracted based at least in part on the values of the stratigraphic property per an iso-surface extraction block 484, for example, where one or more of the extracted iso-surfaces may be defined to be a horizon surface (e.g., or horizon surfaces) per a horizon surface block 486.

As mentioned, particular constraints may impact ability to model dip, thickness variations, etc., for example, due at least in part to contradictions. For example, consider the following three examples of geological situations where types of constraints (e.g., for fitting data and for regularization) may be contradictory, which may, for example, lead to unpredictable and/or undesirable behavior of an interpolated implicit function. In the three examples, large variations of dip, thickness or relative thicknesses of the layers exist locally and/or globally.

As to the first example, it pertains to a local uplift or thinning of the layers, for example, due to movement of ductile material within or below the studied area. Such features may occur on and/or above salt domes or in presence of thick shale layers. In this case, the change of dip and/or thickness of the layers may be of limited extent in a model.

As to the second example, it pertains to a global thickness change, which may be due to a lateral variation of depositional environment (e.g. proximal to distal with respect to the paleo-coast line), associated with differential sedimentation. As an example, such a scenario may occur for large, exploration scale, models.

As to the third example, it pertains to a brutal change of layer thicknesses across faults, which may be associated with the presence of syn-sedimentary faults (e.g., faults that were active while sediments were being deposited). In such scenario, thickness changes may be due to differential variation of accommodation space, for example, on both sides of a fault.

Figure 5:
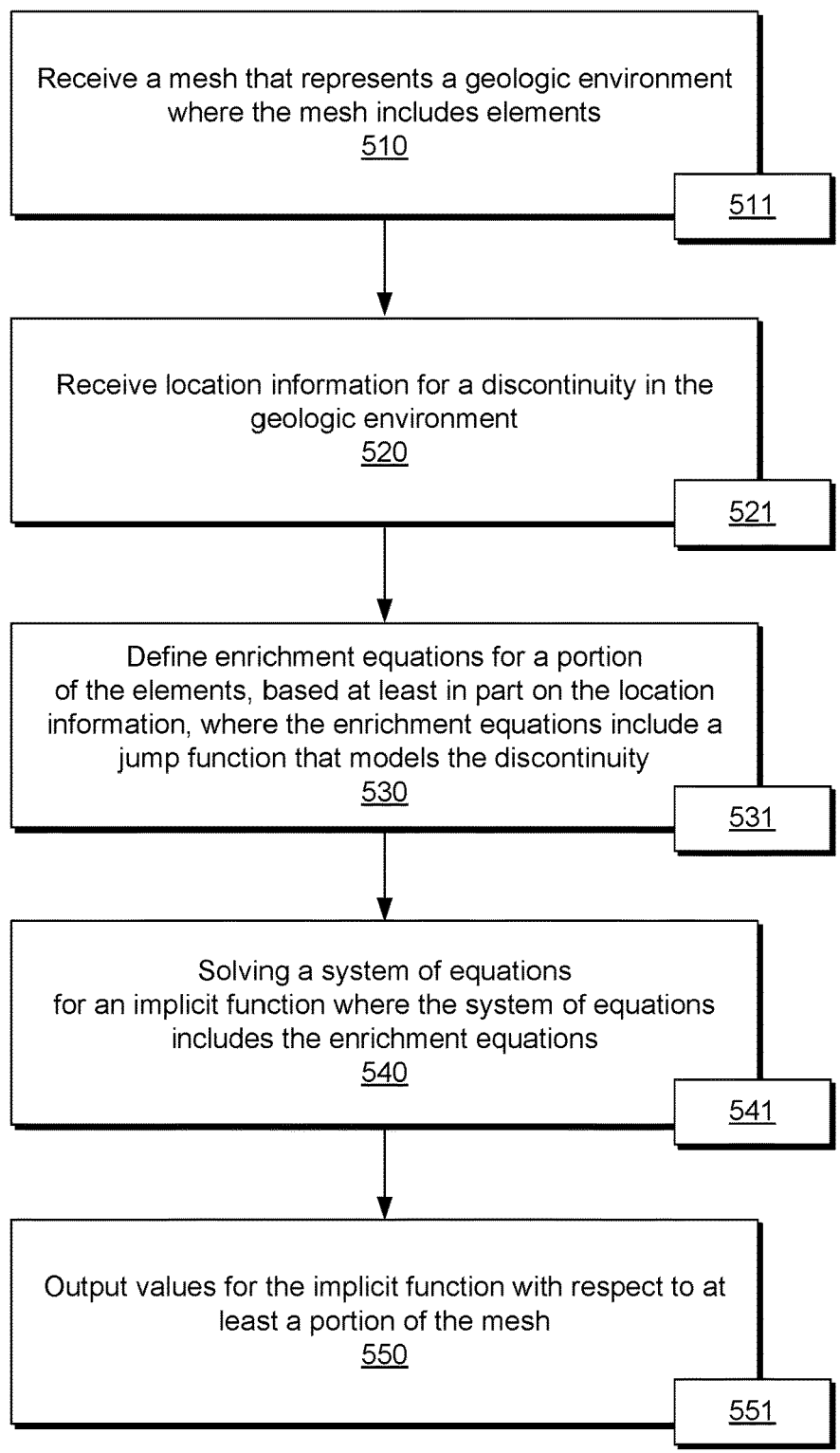
FIG. 5 illustrates an example of a method.

FIG. 5 shows an example of a method 500 that includes a reception block 510 for receiving a mesh that represents a geologic environment where the mesh includes elements; a reception block 520 for receiving location information for a discontinuity in the geologic environment; a definition block 530 for, based at least in part on the location information, defining enrichment equations for a portion of the elements where the enrichment equations include a jump function that models the discontinuity; a solution block 540 for solving a system of equations for an implicit function where the system of equations includes the enrichment equations; and an output block 550 for, based at least in part on solving of the system of equations (e.g., a solution), outputting values for the implicit function with respect to at least a portion of the mesh. As to the enrichment equations of the definition block 530, these may correspond to enrichment equations of the extended finite element method (XFEM). Thus, the method 500 may include implementing the XFEM.

The method 500 is shown in FIG. 5 in association with various computer-readable media (CRM) blocks 511, 521, 531, 541 and 551. Such blocks generally include instructions suitable for execution by one or more processors (or cores) to instruct a computing device or system to perform one or more actions. While various blocks are shown, a single medium may be configured with instructions to allow for, at least in part, performance of various actions of the method 500. As an example, a computer-readable medium (CRM) may be a computer-readable storage medium. As an example, the blocks 511, 521, 531, 541 and 551 may be provided as one or more modules, for example, such as the one or more modules 407 of the system 401 of FIG. 4.

As an example, the method 500 can include computing values of a stratigraphic attribute that can, for example, represent subsurface conformable structures. In such an example, the mesh may be a volumetric mesh where discontinuities (e.g., faults) are not explicitly modeled by elements of the mesh. For example, a discontinuity may pass through one or more elements without being modeled explicitly by a node of an element, an edge of an element, or a side of an element. As an example, a mesh may include elements that fill a domain where the domain represents a volume that corresponds to a geologic environment (e.g., a box, etc.). As an example, a method may act to relax mesh dependence on geometry of one or more faults, for example, by introducing enrichment equations that can account for the one or more faults as one or more discontinuities within a mesh.

As an example, where modeling may occur without explicitly geometrically gridding a mesh to conform to a discontinuity, modeling may be expedited. For example, consider an ability to account for one or more discontinuities, adjust one or more discontinuities, etc., without having to adjust one or more nodes, elements, etc., and/or introduce additional nodes, elements, etc. In such an example, a method may be implemented to rapidly construct a structural model without introducing complexity to mesh generation as associated with geometric modeling of a discontinuity. In such an example, a model may be adjusted, updated, etc., for example, to more accurately model a fault, etc. (e.g., without geometric adjustment to a mesh). As an example, an approach such as that of the method 500 of FIG. 5 may include uncertainty quantification of one or more discontinuities (e.g., faults geometries), for example, at reduced computational demand when compared to an approach that includes explicitly geometrically modeling discontinuities in a mesh.

Figure 6:
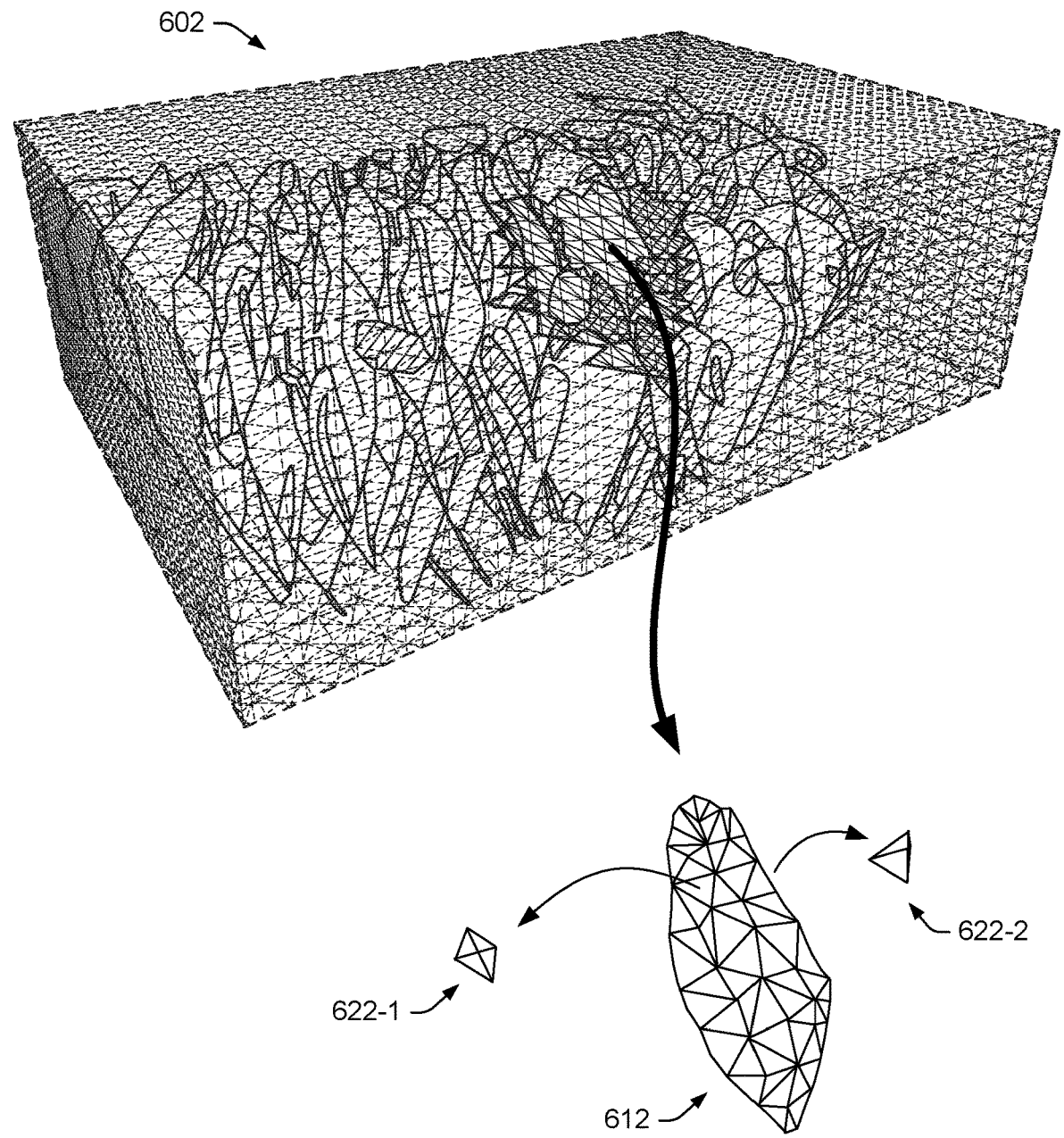
FIG. 6 illustrates an example of a mesh.

FIG. 6 shows an example of a mesh 602 that includes faults such as the fault 612. While the fault 612 may be three-dimensional in shape, it can be represented by a set of individual two-dimensional polygons (e.g., triangles). In such an example, the mesh 602 may be volumetrically filled by individual three-dimensional polyhedral (e.g., tetrahedra). As an example, a mesh may include simplexes (e.g., simplices), which may be n-simplexes (e.g., triangles where n=2, tetrahedra where n=3, etc.).

To properly represent the fault 612 within the mesh 602, the volumetric elements (e.g., tetrahedra, etc.) are arranged such that the fault 612 is modeled as a surface that is bound by a set of volumetric elements to one side and another set of volumetric elements to the other side. In the example of FIG. 6, consider the tetrahedra 622-1 and 622-2 where the tetrahedron 622-1 is positioned to one side of the fault 612 and where the tetrahedron 622-2 is positioned to the other side of the fault 612. Thus, the fault 612 may be represented as a surface, for example, a triangulated surface where each of the triangles in the triangulated surface has to one side a volumetric element and has to another side a volumetric element.

As an example, a method can include representing three-dimensional geological horizons by iso-surfaces of a scalar attribute (e.g., stratigraphic attribute or implicit attribute) within a three-dimensional volumetric mesh such as the mesh 602. In such an example, the mesh embeds fault geometry beforehand (e.g., a priori) to capture faults as discontinuities into the scalar attribute. Thus, such a method can include an initial phase that includes generating a three-dimensional volumetric mesh that conforms to the faults geometries. As shown in FIG. 6, the mesh 602 is faulted and represents those discontinuities.

Generation of a mesh such as the mesh 602 of FIG. 6 can present some challenges as each fault surface introduces constraints into the mesh generation process. Further, challenges may stem from some types of complex fault geometries. For example, consider a complex fault shape that acts to constrain mesh resolution to such a degree that producing mesh elements (e.g., cells) of acceptable quality presents challenges.

As an example, consider a process referred to as tetrahedralization, which can be implemented to generate a collection of tetrahedra for an input domain, a point set, a polyhedron, etc., where the tetrahedra meet at one or more shared features (e.g., vertices, edges, or triangles). In comparison to triangulation (e.g., of a surface), tetrahedralization (e.g., of a volume) can involve some additional considerations. As an example, as in two dimensions, a parameter "n" can represent a number of vertices of an input domain (e.g., a geologic environment) where tetrahedralization may introduce tetrahedra that "fill" the input domain where each tetrahedron is defined by four vertices. In various types of numerical methods, such as the finite element method, a condition may be imposed that a mesh does not include degenerate elements. Where an input domain includes features that act as geometric constraints (e.g., objects, surfaces, etc.), a method that aims to avoid degenerate elements may incur additional computational costs. As an example, consider a process such as "annealing" that may act to adjust positions of nodes, connections between nodes, etc. in an effort to avoid degenerate elements.

Figure 7:
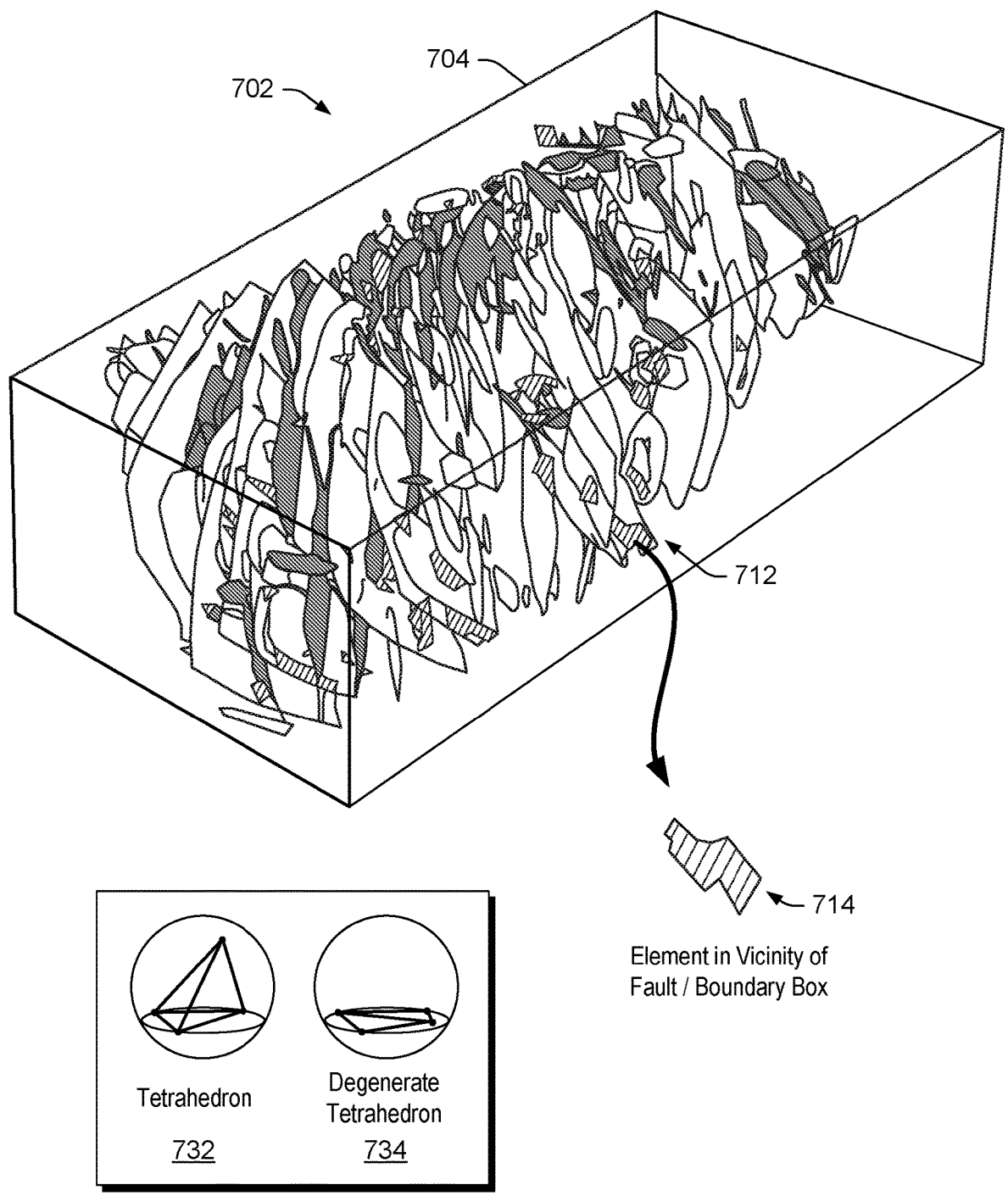
FIG. 7 illustrates an example of a mesh and examples of tetrahedra.

FIG. 7 shows an example of a mesh 702 with a boundary box 704 (e.g., a domain) where various faults, such as the fault 712, exist within the boundary box 704. As illustrated, an element 714 in the vicinity of the fault 712 and the boundary box 704 can be ill-shaped for purposes of computations. As an example, an ill-shaped element may be a sliver (e.g., in terms of aspect ratio, etc.), a degenerated simplex, a tetrahedron with a volume of an order of magnitude or more less than other "acceptable" tetrahedra, etc. FIG. 7 also shows an example of a tetrahedron 732 and an example of a degenerate tetrahedron 734. In such examples, a tetrahedron may be analyzed with respect to a volume, for example, consider an analysis that assesses in part a diameter of a circumsphere of tetrahedron, a diameter of the smallest sphere embraced by a tetrahedron, etc. As mentioned, such an analysis may have associated computational demands and, as an example, while degenerate tetrahedra may be avoided, in adjusting a mesh (e.g., via annealing, etc.), the number of elements (e.g., vertices, etc.) may increase, which, in turn, can have an associated increase computational demands (e.g., memory, computation time, etc.).

In a method such as the method 410 of FIG. 4, a numerical solver that calculates values of an implicit function (see, e.g., the block 464 of the method 410), may experience numerical errors, floating point exceptions, etc. where one or more elements are ill-shaped (e.g., high aspect ratio, degenerate, etc.).

As an example, consider a scenario where a mesh is to be updated. For example, consider receiving an existing mesh and then updating the existing mesh to include one or more additional fault surfaces, to adjust the existing mesh to account for new information about one or more fault surfaces, etc. Such updating may incur various computational demands, for example, as a method for an updated mesh may include analyzing the updated mesh (e.g., "optimizing" the updated mesh) such that in one or more adjusted and/or new regions elements are not ill-shaped.

Fault geometries, as subterranean features, can be susceptible to various types of uncertainties. For example, seismological interpretation of faults can include uncertainties as to extent, position, etc. of a fault. As an example, where a model intends to model fractures, uncertainty may exist as to extent, position, etc. of one or more fractures. Where fractures include hydraulic fractures, such fractures may be generated in stages where, for example, a mesh is to be updated after each stage. For various reasons, updating a mesh to conform the mesh to one or more features in a domain can be computationally intensive. A workflow that includes updating a mesh can degrade user experience and restrict scenario-based approaches, which may have consequences as to predictions that may be made based at least in part on a model (e.g., a structural model of a geologic environment).

As an example, as explained with respect to the method 500 of FIG. 5, a method can include implementing the extended finite element method (XFEM). The XFEM is a numerical technique that extends the finite element method (FEM) approach by enriching a solution space for solutions to differential equations with discontinuous functions.

Figure 8:
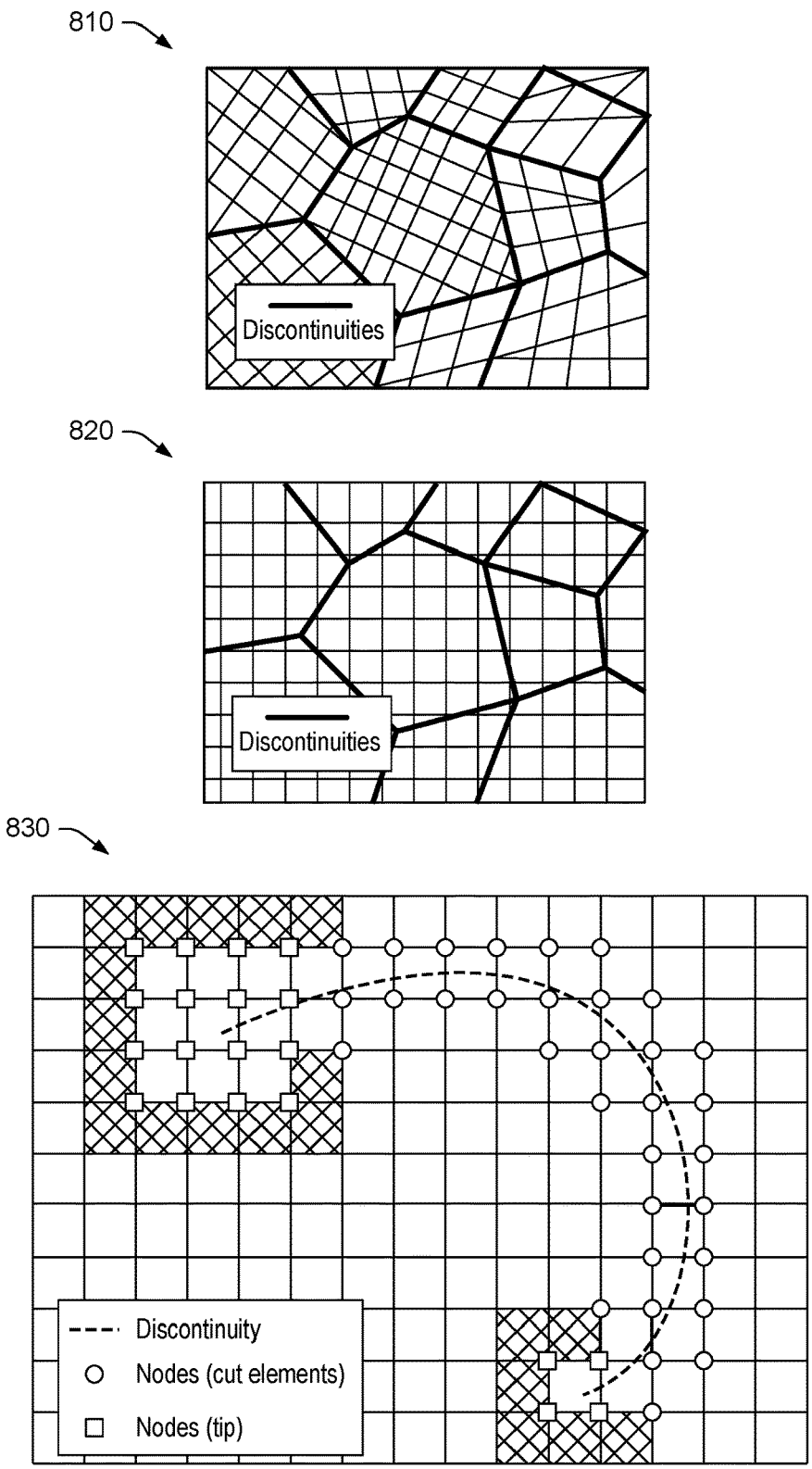
FIG. 8 illustrates examples of meshes.

FIG. 8 shows an example of a mesh 810 that includes discontinuities, an example of a mesh 820 that includes discontinuities and an example of a mesh 830 that includes a discontinuity (e.g., a discontinuous feature or discontinuity feature). In the mesh 810, elements conform to the discontinuities while, in the mesh 820, discontinuities can intersect elements. As shown in the example mesh 810, the elements may be unstructured while, in the example mesh 820, the elements may be structured. As to the mesh 830, various nodes are identified including nodes of elements that are intersected by the discontinuity and nodes of elements that are adjacent to a tip (e.g., an end of the discontinuity) or within a neighborhood of a tip (e.g., an end of the discontinuity).

In FIG. 8, the mesh 810 may be a finite element method (FEM) mesh while the mesh 820 may be an extended finite element method (XFEM) mesh.

The finite element method (FEM) can include generating a mesh of elements, defining basis functions (e.g., shape functions) on "reference" elements and mapping of reference elements onto elements of the mesh. The XFEM can include applying a partition of unity to a topological space X, for example, to form a set R of continuous functions from X to a unit interval (e.g., [0,1]) such that for each point, x∈X, there is a neighborhood of x where a finite number of the functions of R are non-zero (e.g., where other functions of R are zero) and where the sum of function values at x is unity (e.g., $\Sigma_{\rho \in R} \rho(x)=1$). Partition of unity can allow for the presence of a discontinuity (e.g., or discontinuities) in an element by enriching degrees of freedom with particular displacement functions.

The XFEM can include so-called "jump" functions where such functions may account for discontinuities. As an example, a discontinuity may be classified as a type of discontinuity. For example, consider discontinuity classified as a weak discontinuity or as a strong discontinuity. A weak discontinuity may be a type of discontinuity associated with a jump in a gradient of a solution. In such an example, an enrichment function may be chosen such as the abs-function. For a strong discontinuity, a jump may be present in a solution. In such an example, an enrichment function may be choses such as the sign-function or the Heaviside function. The Heaviside function (e.g., a unit step function), which may be denoted by H, is a discontinuous function. For example, for negative arguments, the value of the Heaviside function can be set to zero and, for positive arguments, the value of the Heavside function can be set to unity (e.g., or vice-versa, etc.).

As an example, a method can include implementing discontinuous basis functions and polynomial basis functions for nodes that belong to elements that are intersected by a discontinuity, for example, optionally to provide a basis that can account for discontinuity opening displacements. As an example, implementation of the XFEM can improve convergence rates and accuracy. As an example, implementation of the XFEM for modeling one or more discontinuities may alleviate including representations of such one or more discontinuities by a mesh (e.g., conforming triangles, tetrahedra, etc.).

As an example, consider implementation of the XFEM to alleviate discretization of discontinuity feature interfaces in a mesh, for example, to allow for propagation modeling of a discontinuity feature.

Figure 9:
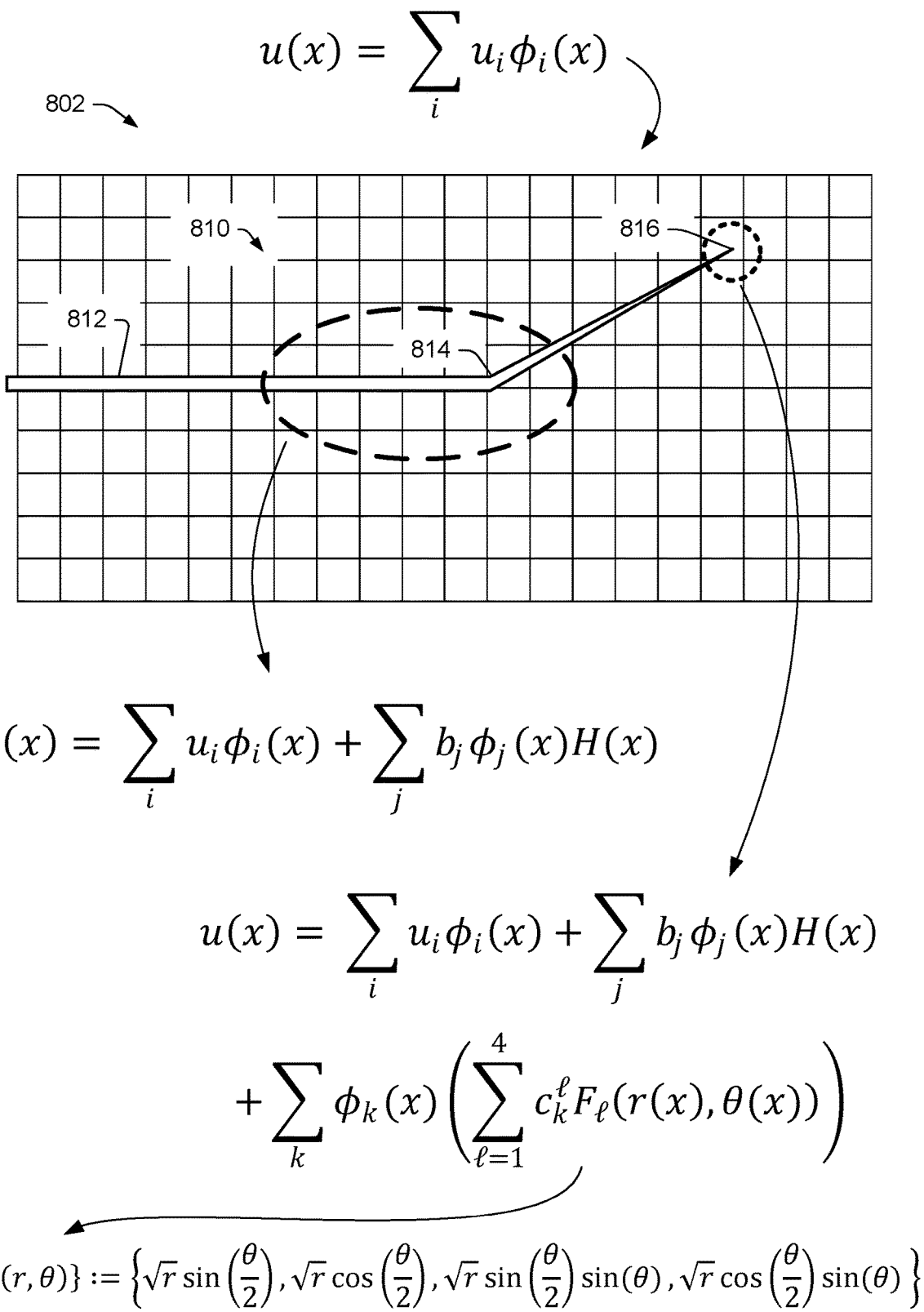
FIG. 9 illustrates an example of a mesh and examples of equations.
Figure 10:
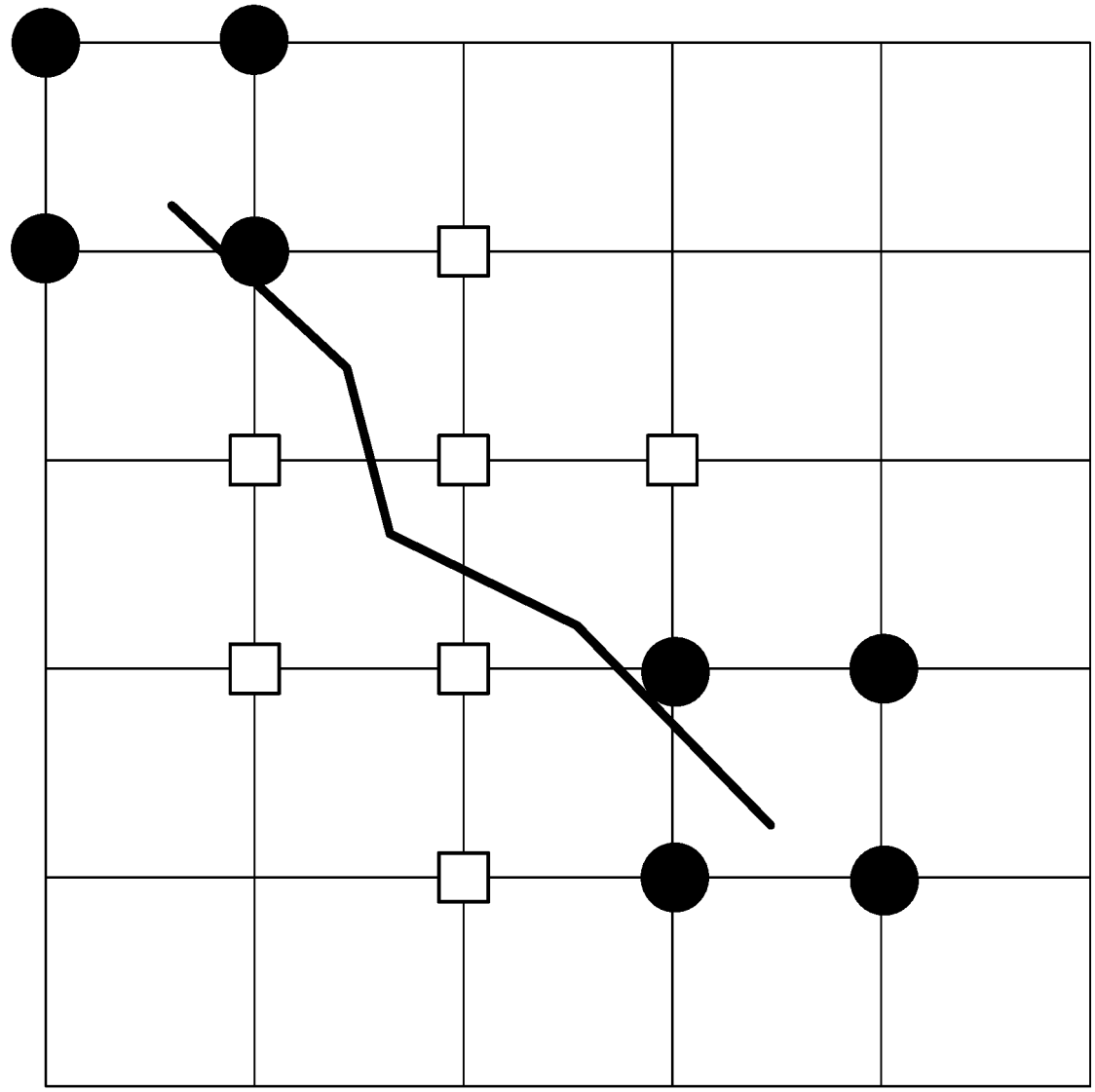
FIG. 10 illustrates an example of a portion of a mesh.

FIG. 9 shows an example of a mesh 902 of a domain that includes a discontinuity feature 910 that includes a portion 912, a feature transition portion 914 and a feature tip 916. The mesh 902 includes various nodes or vertices. In the example of FIG. 9, equations may be formulated that can account for various types of nodes. For example, the nodes of the mesh 902 may be classified as being on a particular class or classes: model nodes, nodes whose shape function support is cut by the feature interior (e.g., of the feature 910), and nodes whose shape function support is cut by a feature tip (e.g., the feature tip 916).

FIG. 9 shows various equations, which are reproduced below as Equations (1) to (4):

$$u(x) = \sum_i u_i \phi_i(x) \qquad (1)$$

$$u(x) = \sum_i u_i \phi_i(x) + \sum_j b_j \phi_j(x) H(x) \qquad (2)$$

$$u(x) = \sum_i u_i \phi_i(x) + \sum_j b_j \phi_j(x) H(x) + \sum_k \phi_k(x) \left( \sum_{\ell=1}^{4} c_k^\ell F_\ell(r(x), \theta(x)) \right) \qquad (3)$$

$$\{F_\ell(r, \theta)\} := \qquad (4)$$
$$\left\{ \sqrt{r} \sin\left(\frac{\theta}{2}\right), \sqrt{r} \cos\left(\frac{\theta}{2}\right), \sqrt{r} \sin\left(\frac{\theta}{2}\right) \sin(\theta), \sqrt{r} \cos\left(\frac{\theta}{2}\right) \sin(\theta) \right\}$$

Equation (1) can apply for the mesh 902; Equation (2) can apply for the mesh 902 with the discontinuity feature 910 (e.g., a discontinuous feature in the domain represented by the mesh 902); and Equation (3) can apply for the mesh 902 with the discontinuity feature 910 where it includes the feature tip 916 within the mesh 902 where, for example, Equation (4) may be used as a near tip enrichment function (e.g., within a radius, r). As shown, Equations (2) and (3) include a jump function such as, for example, the Heaviside function.

As an example, a method can include enrichment of an interpolation function. For example, consider Equations (1), (2) and (3) where the first sum can represent classical shape functions, the second sum can account for one or more completely faulted elements by adding a Heaviside multiplier to the shape function and the third sum can represent enrichment at a tip-loop (e.g., with singular functions such as in, for example, Equation (4)).

As an example, a feature in a geologic environment may be treated as a stationary feature. As an example, a feature in a geologic environment may be treated as a dynamic feature. As an example, for a particular solution (e.g., at a particular time or a particular span of time), a feature may be treated as a stationary feature. In such an example, one or more parameters may be updated based on the solution, for example, to update the feature (e.g., for a solution at another time, etc.).

FIGS. 10, 11, 12 and 13 show examples of meshes 1010, 1110, 1210 and 1310. In the mesh 1010 of FIG. 10, a fault is shown that passes through various elements (e.g., intersects elements) where enrichment functions may be employed. For example, nodes marked with open squares can represent Heaviside-type enrichment and nodes marked with dots can represent tip-loop enrichment with singular functions.

Figure 11:
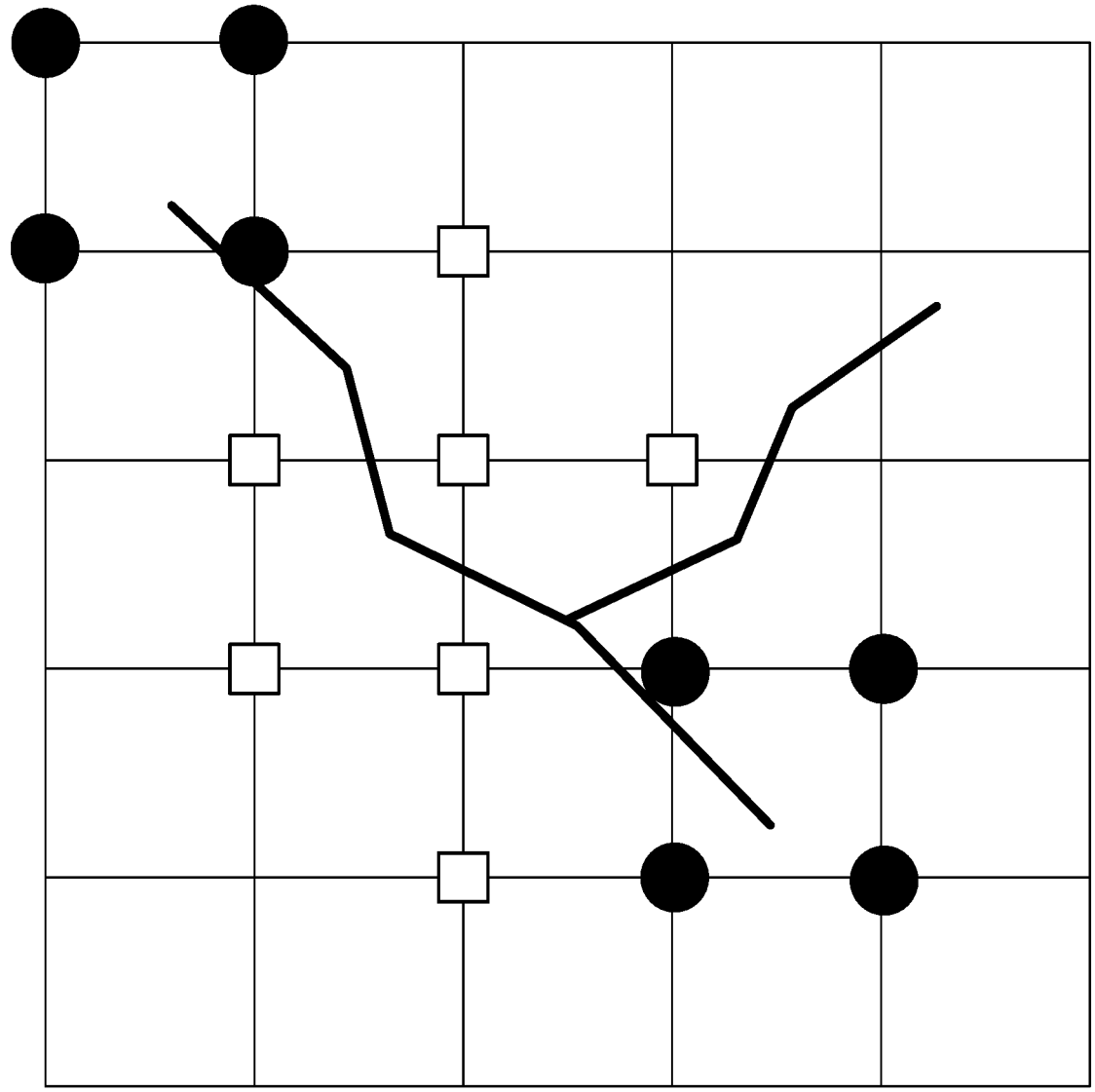
FIG. 11 illustrates an example of a portion of a mesh.
Figure 12:
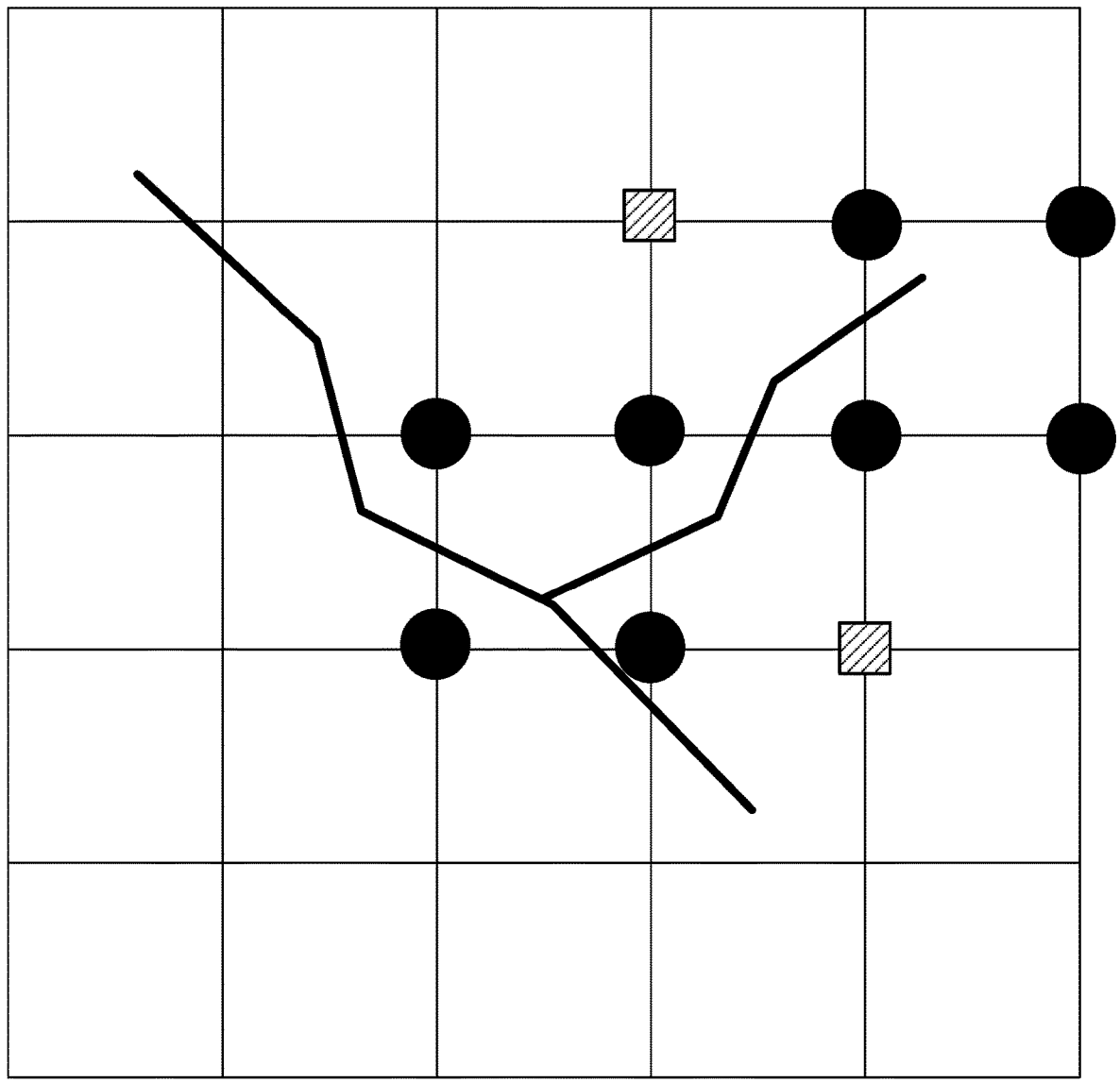
FIG. 12 illustrates an example of a portion of a mesh.
Figure 13:
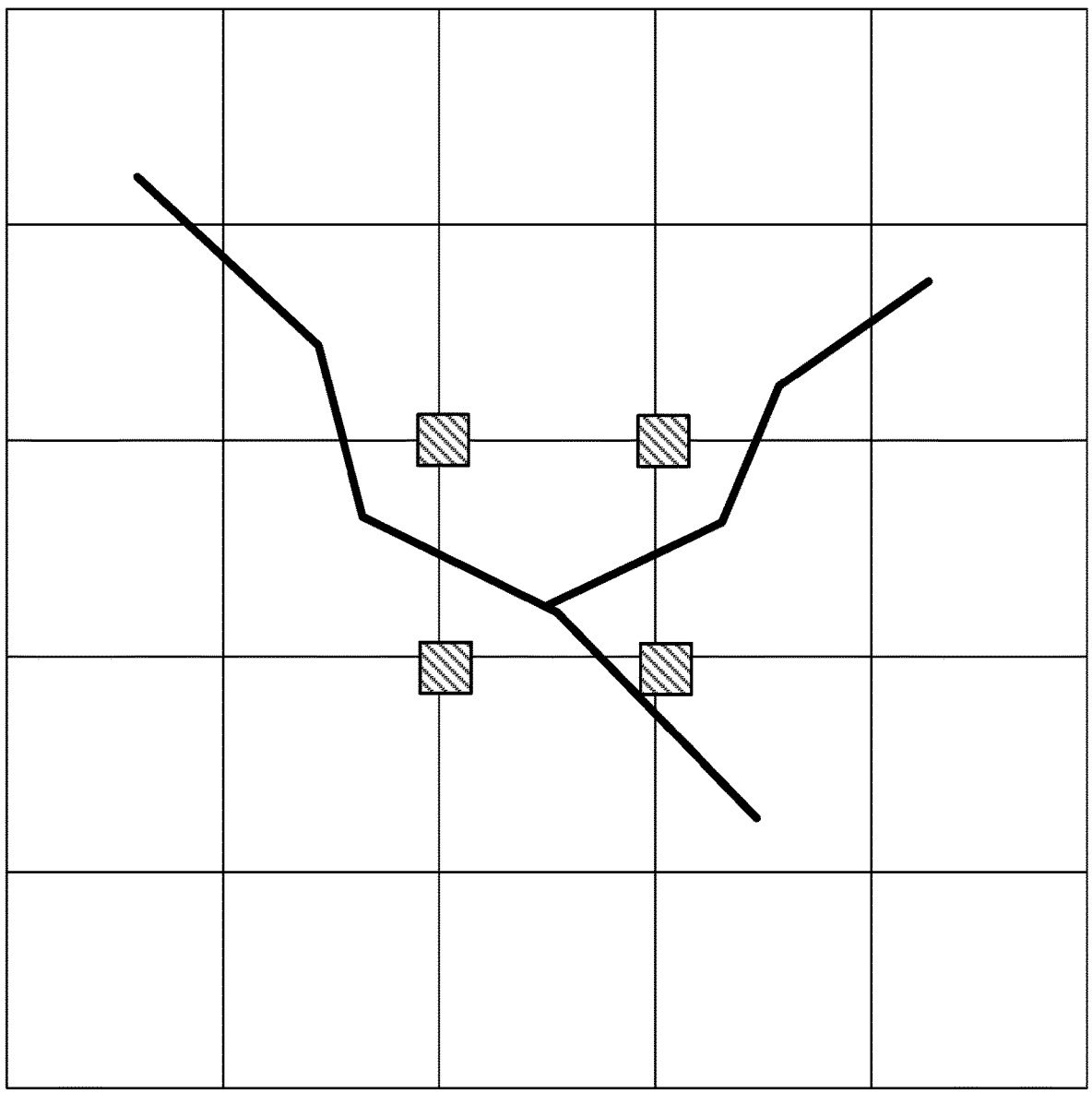
FIG. 13 illustrates an example of a portion of a mesh.

In the mesh 1110 of FIG. 11, a fault is shown that includes a branch (e.g., intersecting faults, etc.) where, for example, a method may employ enrichment of one or more branching faults. As shown in the mesh 1110, enrichment may be employed for the upper left to lower right fault; as shown in the mesh 1210, enrichment may be employed for the center to upper right fault; and, as shown in the mesh 1310, enrichment may be employed for the junction between the two faults (e.g., for a point, points, a line, lines, etc.).

Figure 14:
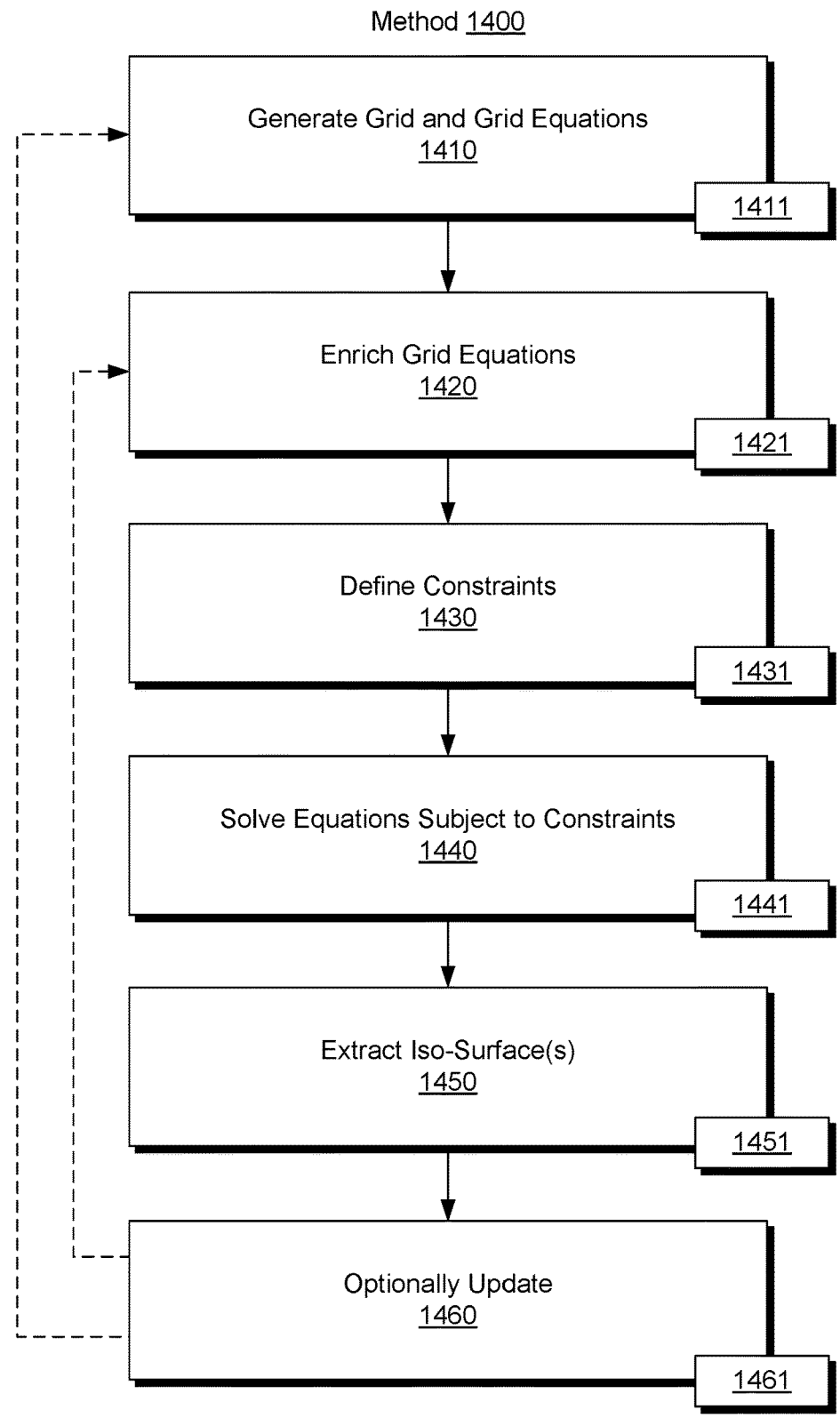
FIG. 14 illustrates an example of a method.

FIG. 14 shows an example of a method 1410 that includes a generation block 1410 for generating a grid and grid equations (e.g., as associated with a numerical solver, etc.), an enrichment block 1420 for enriching the grid equations (e.g., as to one or more discontinuities in the grid, etc.), a definition block 1430 for defining constraints, a solution block 1440 for solving equations subject to the constraints to provide a solution, an extraction block 1450 for extracting at least one iso-surface based at least in part on the solution and an optional update block 1460 for updating at least one parameter, dimension, discontinuity, etc. As an example, the method 1410 can include updating per the update block 1450 and continuing to one or more of the other blocks (e.g., the generation block 1410, the enrichment block 1420, etc.).

As an example, the method 1410 may implement an XFEM approach for a domain represented by a grid (e.g., a mesh). For example, the method 1410 may include implementing the XFEM to solve equations defined with respect to the grid and subject to constraints to provide a solution and, based at least in part on the solution, constructing values of a stratigraphic attribute (e.g., with respect to the grid). In such an example, the XFEM approach may allow for modeling one or more discontinuities in the domain without accounting for such discontinuities with refinements to a grid. For example, one or more discontinuities in the domain may be accounted for using enrichment equations where elements (e.g., nodes, edges, surfaces, etc.) of the grid do not "align" (e.g., model) the one or more discontinuities. In such an example, the discontinuities may be, for example, one or more faults. As an example, a grid may be structured or unstructured or may include one or more structured portions and one or more unstructured portions.

The method 1410 is shown in FIG. 14 in association with various computer-readable media (CRM) blocks 1411, 1421, 1431, 1441, 1451 and 1461. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1410. As an example, a computer-readable medium (CRM) may be a computer-readable storage medium. As an example, the blocks 1411, 1421, 1431, 1441, 1451 and 1461 may be provided as one or more modules, for example, such as the one or more modules 407 of the system 401 of FIG. 4.

As to the block 1410 of FIG. 14, as an example, a background grid may cover an area of interest of a model, for example, including data to be incorporated in a structural model. As an example, grid resolution may be adapted to geological features (horizons, unconformities and faults). In such an example, the resolution may be defined such that a discontinuity extends through a plurality of elements of the grid (e.g., compared to being entirely within a single element). As an example, a background grid can be composed of identifiable cells (e.g., elements) where the grid may be, or include, one or more of a structured regular grid, an unstructured irregular grid, a structured irregular, a tartan grid, an octree, etc.

As to the block 1420 of FIG. 14, it can include preparing an underlying finite element method (FEM) representation inside a grid to take into account discontinuities of the faults. Such an approach can include identifying cells (e.g., elements) of the grid that include a portion of a given discontinuity (e.g., a given fault). As an example, different additional degrees of freedom, associated with enrichment functions, can be added to the FEM representation, for example, depending if a fault tip belongs to a given cell or not. Moreover if a branch exists with respect to faults (e.g., optionally determined via a detection analysis) and a branch point or branch line (e.g., one or more types of junctions) is within a given cell, another enrichment function may be added to represent the branch point or branch line. Such an approach may allow for a more consistent representation of individual discontinuities that a fault system may induce on, for example, an implicit function (e.g., values of which may be used to compute a stratigraphic attribute). As an example, a method can include representing one or more singularities associated with a discontinuity via one or more enrichment functions (e.g., consider an end, a tip, etc.).

As an example, a fault, in three-dimensions, may include an end defined by a line that spans at least several elements of a mesh. In such an example, appropriate enrichment equations may be defined for such elements.

As to the definition block 1430 of FIG. 14, it can include expressing constraints, for example, in a linear or non-linear algebraic system of equations. For example, a method may include constructing an implicit attribute where the method includes generating different constraints in a linear or non-linear algebraic system of equations where the constraints act to enforce different properties of the implicit attribute.

As an example, consider a condition where an implicit function is to conform to given horizon data, therefore, once a given value has been attributed to an individual horizon, then a local algebraic constraint can be created for individual data points of the horizon that lie in a given cell of a grid. As an example, consider smoothness as a constraint. For example, consider introducing some type of smoothness on an implicit function as a constraint on at least one gradient of the implicit function. As an example, a gradient of an implicit attribute may be constrained to be as smooth as possible (e.g., within one or more error limits). As an example, one or more other types of constraints may be imposed. For example, consider horizons dip constraints, user constraints on an implicit function (e.g., if a user wants to model non-conformable events), controlling magnitude of an implicit attribute gradient (e.g., which can be imposed as a non-linear constraint), etc. As an example, constraints can be represented by local integrals which, once computed, can translate into local linear (e.g., or non-linear) algebraic systems involving few degrees of freedom of a background grid.

As an example, a method can include defining (e.g., imposing) constraints in cells that do not include a discontinuity and include defining (e.g., imposing) constraints in cells that do include a discontinuity (e.g., or discontinuities as in the example of a junction). As to the latter, an enrichment function at a fault tip (e.g., a fault end) can be singular and an integration rule may be adapted accordingly. For example, consider one of the following techniques to address a singularity: Delaunay triangulation of a faulted cell; creation of a mapping to equivalent polynomials (e.g., integrated using standard quadrature techniques); and Gauss quadrature. As an example, once an integration technique has been selected, a method can include computing constraints expressed as local integrals.

As to the block 1440 of FIG. 14, as an example, depending on the type of constraints used, the system may be linear or non-linear with respect to the degrees of freedom (the discretized field of a stratigraphic attribute). As an example, if a system is non-linear, a gradient-descent or Newton method may be used to solve a succession of linear system equations. As an example, at a given linear increment, when lumped together, different constraints can generate a linear, rectangular system of m equations (the constraints) involving n unknowns (the degrees of freedom), which can then be solved for implicit attribute values at that increment (e.g., implicit function values).

As to the block 1450 of FIG. 14, due to the additional enrichment functions, extracting iso-surfaces in a faulted cell may be accomplished via an appropriate technique. As an example, a method may include one or more of a marching-cube algorithm, a marching-tetrahedra algorithm and/or one or more other algorithms. As an example, re-meshing of a faulted fault for purposes of integration, if used, may be re-used to extract values of a stratigraphic attribute.

Figure 15:
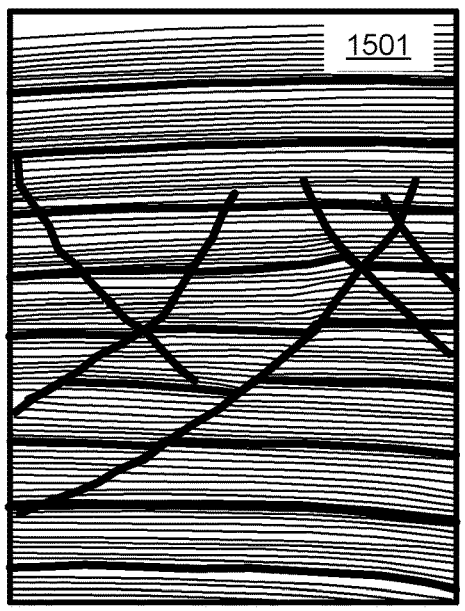
FIG. 15 illustrates examples of values of implicit functions.
Figure 15:
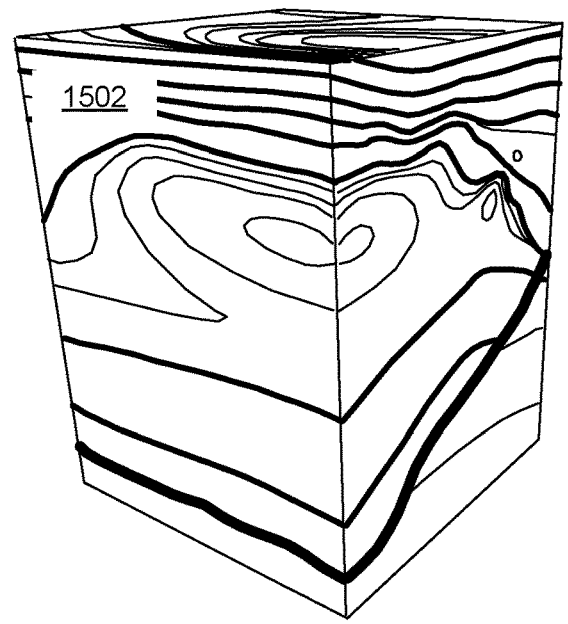
Figure 15:

FIG. 15 shows various example plots 1501, 1502 and 1503 that illustrate values of an implicit function (e.g., as a stratigraphic attribute). As illustrated, various features in a geologic environment may be discerned in the plots 1501, 1502 and 1503, optionally including one or more discontinuities, etc.

As an example, a method can include a performance block for one or more uncertainty analyses (e.g., as part of a workflow, etc.). In such an example, an update may occur as to a description of a discontinuity or discontinuities (e.g., a fault, faults, etc.). As an example, an XFEM-based approach can allow for computation of a stratigraphic attribute with a reduced computation demand compared to an approach that involves grid adjustments that conform to geometry of a fault or faults. For example, an XFEM approach can explore various scenarios (e.g., realizations) without having to modify an underlying background grid. Thus, such an approach may be implemented for scenario-based analysis (e.g., as in uncertainty analysis workflows). As an example, where a few parameters have been derived to parameterize a fault system, a method may include repeating enrichment, etc. for one or more additional scenarios (given fault configurations) with reduced computational cost, allowing a user to analyze a considerable number of cases, hypotheses, etc. and, for example, optionally assessing sensitivity of a structural model to fault system uncertainty.

As to interpolations, as an example, once a value $\varphi(p)$ has been assigned to individual control point constraints, an interpolation of the implicit function may be performed, for example, by solving a linear system of equations that may include at least one constraint on the value and/or gradient of the implicit function and at least one regularization constraint (e.g. smooth gradient, constant gradient and/or harmonic constraint). In such an example, output may include a property $\varphi(\alpha)$, the value of which may be defined at individual nodes (e.g., where $\alpha$ represents an individual node) of a background mesh. In such an example, interpolation may occur locally within individual elements of the mesh (e.g. by linear interpolation if the mesh elements are simplices). As an example, a method may employ a cubic Hermite spline or cubic Hermite interpolator where individual pieces are third-degree polynomial specified in Hermite form (e.g., via values and first derivatives at end points).

As an example, a method may include extracting one or more horizon surfaces (e.g., or other feature surface) using one or more iso-values of a stratigraphy property, which may be a stratigraphy function.

As an example, horizon surfaces (e.g., as used as input; other, intermediate horizons; etc.) may be extracted from a stratigraphy function, for example, by using an iso-surfacing algorithm.

As an example, one or more types of surfaces may be extracted from a stratigraphy function, for example, using a surface extraction algorithm and/or a volume extraction algorithm. As an example, a surface may be a surface of an unconformity or another type of feature within an environment. As an example, a method can include extracting one or more surfaces that may be horizon surfaces that may be adjacent to, intersected by, shaped by, etc., one or more other types of surfaces and/or volumes (e.g., unconformities, geobodies, etc.).

As an example, a method may be implemented to create, at least in part, a 3D model of a subsurface region, to create a 2D model of a cross-section through a sub-surface region, etc.

As an example, a method can include calculating stratigraphy property values by formulating a stratigraphy property as a function of an implicit function. For example, a stratigraphy property $S(\alpha)$ may be represented by the equation $S(\alpha)=g(\varphi(\alpha), x, y)$ where $\alpha$ represents individual nodes of the mesh, where $g(\ )$ is a function of an implicit function $\varphi(\alpha)$ for individual nodes a of the mesh and where x and y are spatial coordinates for individual nodes a of the mesh.

As an example, a method may include a performance block for performing a simulation of phenomena associated with a geologic environment using at least a portion of a mesh (e.g., or a model based on a mesh or meshes). As to performing a simulation, such a simulation may include interpolating geological rock types, interpolating petrophysical properties, simulating fluid flow, or other calculating (e.g., or a combination of any of the foregoing).

As an example, a system may include instructions to instruct a processor to perform a simulation of a physical phenomenon using at least a portion of a mesh (e.g., or a model based on a mesh or meshes) and, for example, to output results of the simulation to a display.

As an example, a method can include receiving a mesh that represents a geologic environment where the mesh includes elements; receiving location information for a discontinuity in the geologic environment; based at least in part on the location information, defining enrichment equations for a portion of the elements where the enrichment equations include a jump function that models the discontinuity; solving a system of equations for an implicit function where the system of equations includes the enrichment equations; and, based at least in part on the solving, outputting values for the implicit function with respect to at least a portion of the mesh. In such an example, the mesh may be defined by nodes that include coordinates. For example, nodes may be defined by coordinates of a coordinate system (e.g., a Cartesian coordinate system, a cylindrical coordinate system, a spherical coordinate system, etc.).

As an example, a jump function may be or include the Heaviside function. As an example, a discontinuity may be or include a fault. As an example, such a fault may intersect at least one element of a mesh. For example, a fault may be a plane that intersects a volumetric element or, for example, a fault may be a line in two-dimensions that intersects a two-dimensional element. As an example, a fault can include at least one fault end that is at least in part in an element. As an example, a jump function can be implemented to model a fault in at least one intersected element and, for example, a different function can be implemented to model an end of the fault. For example, consider a singular enrichment function that can model a fault end as a singularity.

As an example, an environment may include a plurality of discontinuities, which may, in turn, be at least in part within a mesh that represents at least a portion of the environment.

As an example, a mesh and associated equations may be used to solve for values of an implicit function. In such an example, a method may include defining constraints that constrain the implicit function. As an example, values for an implicit function may include values that correspond to horizons within a geologic environment. As an example, a horizon may be shaped by, interrupted by, etc., one or more other geologic features. In such an example, the one or more other geologic features may be or acts as a discontinuity.

As an example, where information about one or more features becomes available (e.g., preexisting features, new natural features, new artificial features, etc.), a method may include updating location information and repeating processes such as defining, solving and outputting. As an example, location information may be or include seismological information from a seismic survey of a geologic environment.

As an example, a method may include implementing one or more enrichment functions of an extended finite element method (XFEM). For example, a mesh may be a finite element mesh that is suitable for application of the finite element method. In such an example, the approach may be extended through inclusion of one or more enrichment functions, which may, for example, facilitate modeling of one or more discontinuities within a space, a volume, etc.

As an example, a system can include a processor; memory operatively coupled to the processor; one or more modules stored in the memory where the one or more modules include processor-executable instructions where the instructions include instructions to: receive a mesh that represents a geologic environment where the mesh includes elements; receive location information for a discontinuity in the geologic environment; based at least in part on the location information, define enrichment equations for a portion of the elements where the enrichment equations include a jump function that models the discontinuity; solve a system of equations for an implicit function where the system of equations include the enrichment equations; and output values for the implicit function with respect to at least a portion of the mesh. In such an example, the jump function may be or include the Heaviside function. As an example, a discontinuity may be or include a fault. As an example, values for an implicit function can include values that correspond to one or more horizons within a geologic environment.

As an example, one or more computer-readable storage media can include processor-executable instructions where the instruction include instructions to instruct a system to: receive a mesh that represents a geologic environment where the mesh includes elements; receive location information for a discontinuity in the geologic environment; based at least in part on the location information, define enrichment equations for a portion of the elements where the enrichment equations include a jump function that models the discontinuity; solve a system of equations for an implicit function where the system of equations include the enrichment equations; and output values for the implicit function with respect to at least a portion of the mesh. In such an example, the jump function can be or include the Heaviside function. As an example, values for an implicit function can include values that correspond to one or more horizons within a geologic environment.

Figure 16:
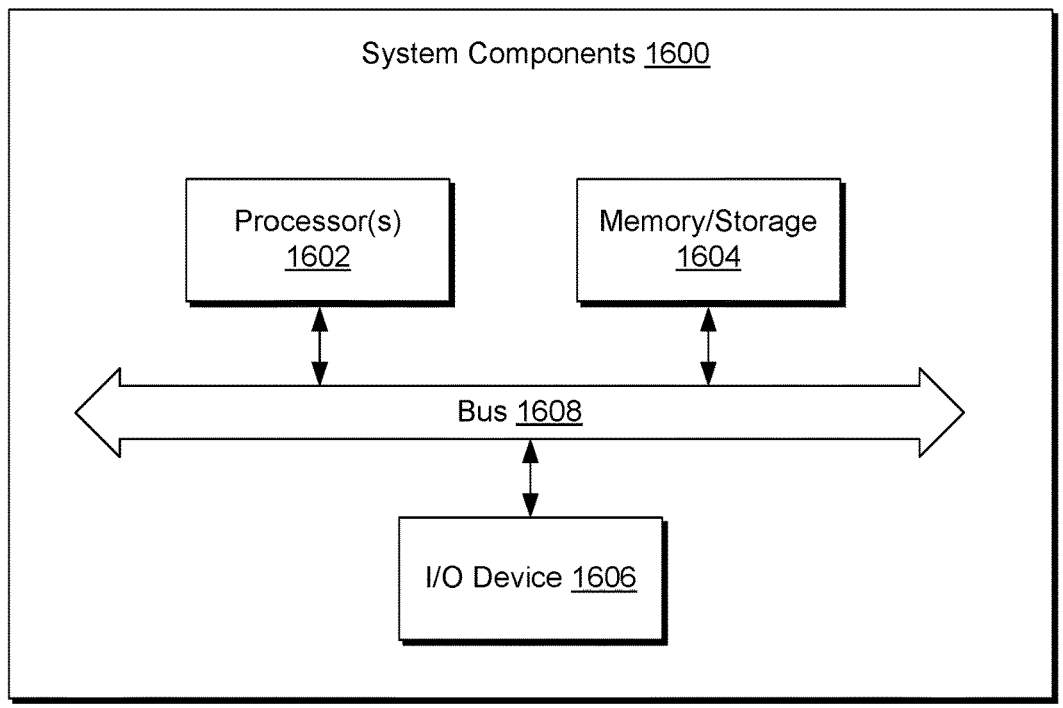
FIG. 16 illustrates example components of a system and a networked system.
Figure 16:
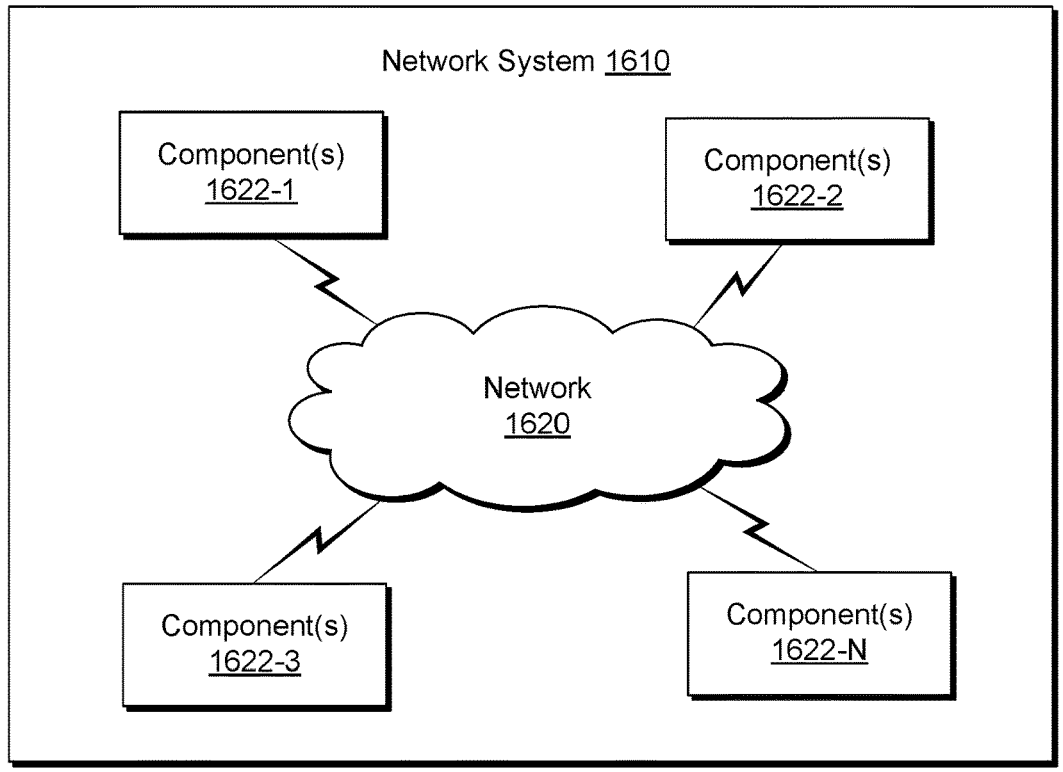

FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method.

The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving a mesh that represents a geologic environment wherein the mesh comprises elements;
   receiving location information for a discontinuity and horizons in the geologic environment;

based at least in part on the location information for the discontinuity, defining enrichment equations for a portion of the elements wherein the enrichment equations comprise a jump function that models the discontinuity;

solving a system of equations for an implicit function using the location information for the horizons, wherein the system of equations comprises the enrichment equations;

based at least in part on the solving, outputting values for the implicit function with respect to at least a portion of the mesh wherein the values for the implicit function comprise values that correspond to the horizons within the geologic environment;

extracting iso-surfaces for the horizons using at least a portion of the values for the portion of the elements of the mesh with the defined enrichment equations to generate a structural model of the geologic environment that spatially represents the discontinuity as intersecting at least a portion of the iso-surfaces that represent at least a portion of the horizons; and simulating physical phenomena using the structural model of the geologic environment.

2. The method of claim 1 wherein the jump function comprises the Heaviside function.

3. The method of claim 1 wherein the discontinuity comprises a fault.

4. The method of claim 3 wherein the fault comprises a fault end at least in part in an element.

5. The method of claim 4 wherein the jump function models the fault in the at least one intersected element and wherein a different function models the fault end.

6. The method of claim 5 wherein the different function comprises a singular enrichment function that models the fault end as a singularity.

7. The method of claim 1 comprising a plurality of discontinuities.

8. The method of claim 1 further comprising defining constraints that constrain the implicit function.

9. The method of claim 1 further comprising updating the location information and repeating the defining, solving and outputting.

10. The method of claim 1 wherein the location information comprises seismological information from a seismic survey of the geologic environment.

11. The method of claim 1 wherein the enrichment functions comprise enrichment functions of an extended finite element method (XFEM).

12. The method of claim 1, wherein the simulating physical phenomena comprises utilizing a reservoir simulator that generates simulation results for fluid flow in the geologic environment.

13. The method of claim 1, wherein the outputting the values for the implicit function prior to the generating reduces uncertainty of a location of the discontinuity in the structural model to improve accuracy of results of the simulating.

14. The method of claim 1, wherein the location information specifies a plurality of different parameter values for the discontinuity and comprising repeating the defining, solving and outputting for each of the plurality of different parameter values to analyze uncertainty of the discontinuity.

15. A system comprising:
a processor;
memory operatively coupled to the processor;
processor-executable instructions stored in the memory wherein the processor-executable instructions comprise processor-executable instructions to:
receive a mesh that represents a geologic environment wherein the mesh comprises elements;
receive location information for a discontinuity and horizons in the geologic environment;
based at least in part on the location information for the discontinuity, define enrichment equations for a portion of the elements wherein the enrichment equations comprise a jump function that models the discontinuity;
solve a system of equations for an implicit function using the location information for the horizons, wherein the system of equations comprises the enrichment equations;
output values for the implicit function with respect to at least a portion of the mesh wherein the values for the implicit function comprise values that correspond to the horizons within the geologic environment;
extract iso-surfaces for the horizons using at least a portion of the values for the portion of the elements of the mesh with the defined enrichment equations to generate a structural model of the geologic environment that spatially represents the discontinuity as intersecting at least a portion of the iso-surfaces that represent at least a portion of the horizons; and
simulate physical phenomena using the structural model of the geologic environment.

16. The system of claim 15 wherein the jump function comprises the Heaviside function.

17. The system of claim 15 wherein the discontinuity comprises a fault.

18. One or more non-transitory computer-readable storage media comprising processor-executable instructions wherein the processor-executable instructions comprise processor-executable instructions to instruct a system to:
receive a mesh that represents a geologic environment wherein the mesh comprises elements;
receive location information for a discontinuity and horizons in the geologic environment;
based at least in part on the location information for the discontinuity, define enrichment equations for a portion of the elements wherein the enrichment equations comprise a jump function that models the discontinuity;
solve a system of equations for an implicit function using the location information for the horizons, wherein the system of equations comprises the enrichment equations;
output values for the implicit function with respect to at least a portion of the mesh wherein the values for the implicit function comprise values that correspond to the horizons within the geologic environment;
extract iso-surfaces for the horizons using at least a portion of the values for the portion of the elements of the mesh with the defined enrichment equations to generate a structural model of the geologic environment that spatially represents the discontinuity as intersecting at least a portion of the iso-surfaces that represent at least a portion of the horizons; and
simulate physical phenomena using the structural model of the geologic environment.

19. The one or more non-transitory computer-readable storage media of claim 18 wherein the jump function comprises the Heaviside function.

* * * * *